United States Patent
Bull et al.

(10) Patent No.: US 12,548,434 B2
(45) Date of Patent: *Feb. 10, 2026

(54) CONFIGURING COMMUNICATIONS FOR A LOAD CONTROL SYSTEM

(71) Applicant: Lutron Technology Company LLC, Coopersburg, PA (US)

(72) Inventors: John H. Bull, Slatington, PA (US); Jordan H. Crafts, Bethlehem, PA (US); James P. Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,545

(22) Filed: Nov. 30, 2023

(65) Prior Publication Data

US 2024/0212481 A1 Jun. 27, 2024

Related U.S. Application Data

(60) Continuation of application No. 17/107,506, filed on Nov. 30, 2020, now Pat. No. 11,869,344, which is a
(Continued)

(51) Int. Cl.
*G08C 17/02* (2006.01)
*H02J 13/00* (2006.01)

(52) U.S. Cl.
CPC ........ *G08C 17/02* (2013.01); *H02J 13/00004* (2020.01); *H02J 13/00022* (2020.01); *H02J 13/00024* (2020.01); *H02J 13/00026* (2020.01)

(58) Field of Classification Search
CPC ................ G08C 17/02; H02J 13/00004; H02J 13/00022; H02J 13/00024;
(Continued)

(56) References Cited

U.S. PATENT DOCUMENTS

| | | | |
|---|---|---|---|
| 4,656,475 | A | 4/1987 | Miller et al. |
| 5,239,205 | A | 8/1993 | Hoffman et al. |

(Continued)

*Primary Examiner* — Adnan Aziz
(74) *Attorney, Agent, or Firm* — Glen R. Farbanish; Michael S. Czarnecki; Philip N. Smith

(57) ABSTRACT

A load control system may include multiple control devices that may send load control messages to load control devices for controlling an amount of power provided electrical loads. To prevent collision of the load control messages, the load control messages may be transmitted using different wireless communication channels. Each wireless communication channel may be assigned to a load control group that may include control devices and load control devices capable of communicating with one another on the assigned channel. A control device may send load control messages to a load control device within a transmission frame allocated for transmitting load control messages. The transmission frame may include equal sub-frames and load control messages may be sent at a random time within each sub-frame. Control devices may detect a status event within a sampling interval to offset transmissions from multiple control devices based on detection of the same event.

23 Claims, 15 Drawing Sheets

Related U.S. Application Data continuation of application No. 15/406,102, filed on Jan. 13, 2017, now Pat. No. 10,854,070, which is a division of application No. 14/302,372, filed on Jun. 11, 2014, now Pat. No. 9,590,453.

(60) Provisional application No. 61/833,643, filed on Jun. 11, 2013.

(58) Field of Classification Search
CPC .......... H02J 13/00026; H02J 2310/12; H04W 52/0225; H04W 52/0229; H04W 52/0238; Y02E 60/00; Y04S 40/126; Y02D 30/70
See application file for complete search history.

(56) References Cited

U.S. PATENT DOCUMENTS

| | | | |
|---|---|---|---|
| 5,838,226 A | 11/1998 | Houggy et al. | |
| 5,848,054 A | 12/1998 | Mosebrook et al. | |
| 5,905,442 A | 5/1999 | Mosebrook et al. | |
| 5,914,796 A | 6/1999 | Selin | |
| 6,366,215 B1 | 4/2002 | Tice | |
| 6,535,544 B1 | 3/2003 | Partyka | |
| 6,687,487 B1 | 2/2004 | Mosebrook et al. | |
| 6,803,728 B2 | 10/2004 | Balasubramaniam et al. | |
| 6,807,463 B1 | 10/2004 | Cunningham et al. | |
| 6,831,569 B2 | 12/2004 | Wang et al. | |
| 7,346,016 B2 | 3/2008 | Nielsen et al. | |
| 7,755,505 B2 | 7/2010 | Johnson et al. | |
| 7,787,485 B2 | 8/2010 | Howe et al. | |
| 7,880,639 B2 | 2/2011 | Courtney et al. | |
| 7,933,240 B2 | 4/2011 | Budampati et al. | |
| 7,940,167 B2 | 5/2011 | Steiner et al. | |
| 8,009,042 B2 | 8/2011 | Steiner et al. | |
| 8,199,010 B2 | 6/2012 | Sloan et al. | |
| 8,228,184 B2 | 7/2012 | Blakeley et al. | |
| 8,451,116 B2 | 5/2013 | Steiner et al. | |
| 8,598,978 B2 | 12/2013 | Knode | |
| 8,723,447 B2 | 5/2014 | Steiner | |
| 8,760,293 B2 | 6/2014 | Steiner | |
| 8,779,905 B2 | 7/2014 | Courtney et al. | |
| 9,590,453 B2 | 3/2017 | Bull et al. | |
| 10,854,070 B2 | 12/2020 | Bull et al. | |
| 2001/0033579 A1 | 10/2001 | Nelson et al. | |
| 2002/0043938 A1 | 4/2002 | Lys | |
| 2002/0087436 A1 | 7/2002 | Guthrie et al. | |
| 2003/0040813 A1 | 2/2003 | Gonzales et al. | |
| 2006/0171332 A1 | 8/2006 | Barnum | |
| 2006/0192697 A1 | 8/2006 | Quick et al. | |
| 2007/0076745 A1* | 4/2007 | Manjeshwar | H04W 74/0808 370/448 |
| 2007/0106426 A1* | 5/2007 | Ensworth | A01G 25/16 239/69 |
| 2008/0316003 A1 | 12/2008 | Barnett et al. | |
| 2009/0058614 A1* | 3/2009 | Roz | H04B 7/00 340/10.4 |
| 2009/0206983 A1 | 8/2009 | Knode et al. | |
| 2010/0052576 A1* | 3/2010 | Steiner | H05B 47/13 315/293 |
| 2011/0251807 A1 | 10/2011 | Rada et al. | |
| 2012/0261078 A1 | 10/2012 | Adams et al. | |
| 2012/0268019 A1* | 10/2012 | Briggs | H05B 47/195 315/158 |
| 2012/0281606 A1 | 11/2012 | Cooney et al. | |
| 2013/0211608 A1 | 8/2013 | Farnell et al. | |
| 2014/0152478 A1* | 6/2014 | Lewis | H03M 1/0673 341/123 |
| 2015/0220412 A1* | 8/2015 | Mabuchi | G06F 11/3051 710/18 |
| 2018/0249447 A1 | 8/2018 | Lahetkangas et al. | |

* cited by examiner

CONFIGURING COMMUNICATIONS FOR A LOAD CONTROL SYSTEM

CROSS-REFERENCE TO RELATED APPLICATIONS

This application is a continuation of U.S. Non-Provisional patent application Ser. No. 17/107,506, filed on Nov. 30, 2020, now U.S. Pat. No. 11,869,344, issued Jan. 9, 2024; which is a continuation of U.S. Non-Provisional patent application Ser. No. 15/406,102, filed on Jan. 13, 2017, now U.S. Pat. No. 10,854,070, issued on Dec. 1, 2020; which is a divisional of U.S. Non-Provisional patent application Ser. No. 14/302,372, filed on Jun. 11, 2014, now U.S. Pat. No. 9,590,453, issued on Mar. 7, 2017; which claims the benefit of U.S. Provisional Patent Application No. 61/833,643, filed on Jun. 11, 2013, the entire disclosures of which are hereby incorporated by reference.

BACKGROUND

FIG. 1 depicts an example prior art load control environment 102, such as a room in a residence or an office building. As shown in FIG. 1, the load control environment 102 may include various types of load control devices for controlling an electrical load. The load control devices may include a lighting control device 104 (e.g., a dimmer switch, a ballast, or a light-emitting diode (LED) driver) for directly controlling an amount of power provided from an alternating-current (AC) to an electrical load, such as a lighting load 106, a motorized window treatment 112 for controlling the position of a covering material 114, a thermostat 120 for controlling an HVAC system, and/or a plug-in load control device 122 for controlling an amount of power provided to a floor lamp 124, a table lamp, an appliance, or an electrical load of another device that is plugged in to the plug-in load control device 122. The lighting control device 104, the motorized window treatment 112, the thermostat 120, and/or the plug-in load control device 122 may be two-way communication devices. The lighting control device 104, the motorized window treatment 112, the thermostat 120, and/or the plug-in load control device 122 may be control-target devices that may be capable of receiving and/or implementing control instructions based on load control messages received from one or more control-source devices.

The load control environment 102 may include one or more control-source devices that may transmit load control messages to the control-target devices. The control-source devices may be one-way communication devices. The control-source devices may include a daylight sensor 108, an occupancy sensor 110, a shadow sensor 116 (e.g., a window sensor or a cloudy-day sensor), and/or a remote control device 118. The remote control device 118 may include a wireless switch, a wireless dimmer, a handheld remote control, a keypad, a cellular phone, a tablet, or another wireless remote control device capable of sending a load control message to a control-target device. The load control message from the remote control device 118 may include a user identified command for controlling a control-target device. The daylight sensor 108 may send a load control message to a control-target device based on a detected level of available daylight in the load control environment 102. The occupancy sensor 110 may send a load control message to a control-target device based on detected movement or lack of movement within the load control environment 102. The shadow sensor 116 may send a load control message to a control-target device based on a measured level of light received from outside of the load control environment 102. For example, the shadow sensor 116 may detect when direct sunlight is directly shining into the shadow sensor, is reflected onto the shadow sensor, or is blocked by external means, such as clouds or a building, and may send a message indicating the measured light level. The shadow sensor 116 may be installed at a window level to communicate current exterior light conditions.

A control-target device may control a corresponding electrical load based on the information included within the load control messages received from one or more control-source devices. The lighting control device 104 may increase or decrease the lighting level of the lighting load 106 based on the information received within a load control message. The thermostat 120 may increase or decrease the temperature of the load control environment 102 based on the information received within a load control message. The motorized window treatment 112 may raise or lower the position of the covering material 114 based on the information received within a load control message. The plug-in load control device 122 may turn on and off and/or increase or decrease the power provided to the floor lamp 124, or other device that may be plugged in to the plug-in load control device 122, based on the information received within a load control message.

The control-source device may send the load control message to the control-target device directly or via a system controller 126. The communications between the control-source device and the control-target device may be wireless or wired communications. The load control message may include load control instructions or an indication of a status event from which load control instructions may be determined. The system controller 126 may receive the indication of the status event and may determine load control instructions for being sent to one or more control-target devices. The status event may include a user identified command (e.g., increase or decrease a dimming level of the lighting load 106), a measured light level in the load control environment 102, a detected movement or lack of movement within the load control environment 102, an amount of light directly received from outside of the load control environment 102, or another status event that may be used to control an electrical load.

FIG. 2A depicts an example prior art environment in which multiple load control messages may be transmitted within a wireless range 204. As shown in FIG. 2A, the wireless range 204 may include one or more load control environments 102a, 102b, 102c. The load control environments 102a, 102b, 102c may be included in a building 202. Load control environments 102a and 102b may be on separate floors in the building 202. Load control environments 102a and 102c may be on the same floor in the building 202. Each load control environment 102a, 102b, 102c may include one or more load control devices, such as a lighting control device 104a, 104b, 104c, a daylight sensor 108a, 108b, 108c, an occupancy sensor 110a, 110b, 110c, a motorized window treatment 112a, 112b, 112c, a shadow sensor 116a, 116b, 116c, a thermostat 120a, 120b, 120c, and/or a plug-in load control device 122a, 122b, 122c.

Multiple load control devices can transmit wireless communications at the same time and on the same channel, which tends to cause interference among load control communications transmitted within the wireless range 204. Some load control devices may transmit load control messages at the same time because the load control messages may be transmitted based on the detection of the same updated status event. For example, when daylight sensors 108a, 108b, 108c or shadow sensors 116a, 116b, 116c detect an increased level of light, each sensor may transmit a load control message. As each sensor may detect an increased level of light at the same time, the load control messages transmitted by multiple sensors tends to be transmitted at the same time and cause interference.

As shown in FIGS. 2A and 2B, multiple load control devices may be transmitting load control communications within the same wireless range 204. The wireless range 204 may include communications from load control devices within one or more of the load control environments 102a, 102b, 102c, communications from other load control environments within the building 202, and/or communications from load control devices in other buildings, such as the building 208 shown in FIG. 2B for example. As the number of wireless communications within the wireless range 204 increases, the interference may also increase causing the number of successful communications to decrease.

Referring again to FIG. 2A, some load control systems use the system controller 206 to coordinate the timing of the transmission of load control messages to avoid interference. The system controller 206 may detect interference among load control messages transmitted within the wireless range 204 and may instruct some load control devices to delay communications to avoid message collision. While two-way communication devices may be capable of receiving transmission delay instructions from the system controller 206, one-way communication devices may be unable to receive the transmission delay instructions. The transmission of these transmission delay instructions within the wireless range 204 may also add to the number of communications being transmitted within the wireless range 204, which may cause additional interference initially.

Some control-source devices may independently determine the timing of the transmission of load control messages to avoid interference. A control-source device may detect other communications that may potentially cause interference. The control-source device may transmit load control messages when the amount of other communications within the wireless range 204 is below a threshold.

Some control-target devices may use the signal strength of received load control messages to filter out interference from load control messages intended for a control-target device. A control-target device may process load control messages that are received with a stronger signal strength over load control messages received with a weaker signal strength. For example, the motorized window treatment 112a may receive a load control message from shadow sensor 116b and may determine the received signal strength of the load control message. While receiving the load control message from the shadow sensor 116b, the motorized window treatment 112a may receive a load control message from the shadow sensor 116a. The signal strength of the load control message from the shadow sensor 116a may be stronger because the shadow sensor 116a may be closer to the motorized window treatment 112a. As a result of the proximity of the shadow sensor 116a to the motorized window treatment 112a, the motorized window treatment 112a will stop receiving the load control message from the shadow sensor 116b and begin receiving and processing the load control message from the shadow sensor 116a.

Filtering load control messages based on received signal strength may allow a control-target device to filter out interfering messages and receive the load control messages intended for the control-target device. However, the load control messages intended for the control-target device may reach a targeted device with a weaker signal strength than an interfering signal, which may cause the load control messages intended for the control target device to be improperly discarded.

SUMMARY

A load control system may include control devices that may communicate load control messages to load control devices for controlling an amount of power provided to one or more electrical loads. The control device may be a load control device itself. As described herein, multiple control devices may communicate load control messages at the same time, while mitigating the chance of interference. To prevent collision of the load control messages, the load control messages may be transmitted using multiple wireless communication channels.

Each wireless communication channel may be assigned to a group of control devices that may be configured to communicate with one or more load control devices within the group. The load control groups may be created to isolate control devices that are intended to communicate with load control devices. The control devices and/or load control devices in each load control group may be in the same physical area, such as a room in a building, a floor in a building, a portion of a room or floor in a building, a number of adjacent rooms or floors in one or more buildings, or the like. If a communication channel is assigned to multiple load control groups, the groups that are on the same channel may be separated by a pre-defined distance and/or by other groups that are configured to communicate on other channels, to avoid interference on the channel assigned to the groups.

Communications between devices may be performed via one or more group controllers. Each group controller device may communicate with a group of devices on a single channel. A group controller may communicate with multiple groups of devices by transmitting and/or receiving on multiple channels. The group controller may configure devices in a load control group to communicate on the communication channel assigned to the load control group.

A control device and/or a load control device may be assigned to a load control group and/or configured communicate on a channel assigned to the load control group at the time of manufacture or at the time of installation. The communication channel on which the devices in a load control group may communicate may be configured by pressing a button on the device, pressing a combination of buttons on the device, or via the group controller device.

Control devices may send each load control message within a transmission frame, which may be transmitted over a period of time allocated for transmitting the load control message. The load control message may be sent multiple times within the transmission frame to increase the likelihood that the message may be successfully received. After a first transmission of the load control message, duplicate load control messages may be repeated within the transmission frame. The transmission frame may be divided into equal sub-frames. A load control message may be sent at a random time within each sub-frame. The load control message may be randomly transmitted within each sub-frame to increase the likelihood of successful transmission and reduce the risk of collisions. The transmission frame may be followed by another transmission frame that may include a load control message within each sub-frame.

Control devices may transmit load control messages upon the detection of a status event. The status event may indicate a status at a load control environment (e.g., an amount of light or an occupancy) or a status of a control device (e.g., a button press). The status event may be detected during, or at the end of, a sampling time interval. While the sampling time interval may be the same length for multiple control devices communicating within the load control system, the start and end of the sampling time interval may be offset between devices. After a status event is detected at a control device, the control device may transmit a load control message at a random time within a transmission time interval.

The transmission time interval may overlap with one or more other sampling time intervals for detecting another status event. If another updated status event is detected before the random transmission of the load control message, the control device may determine whether to modify the load control message or prevent the transmission of the load control message (e.g., where the updated status that was detected is the same as the current status being used to control the amount of power provided to an electrical load). If the load control message is modified, it may be transmitted at a random time within the transmission time interval. The random time at which the load control message is transmitted may be the same as, or different from, the random time at which the load control message was scheduled to be transmitted before the detection of the updated status event. If the transmission of the load control message is prevented in the current transmission time interval, another load control message, or the modified load control message, that is based on the updated status may be transmitted in the next transmission time interval. The next load control message may be transmitted during the next uninterrupted transmission time interval.

DETAILED DESCRIPTION

Figure 1:
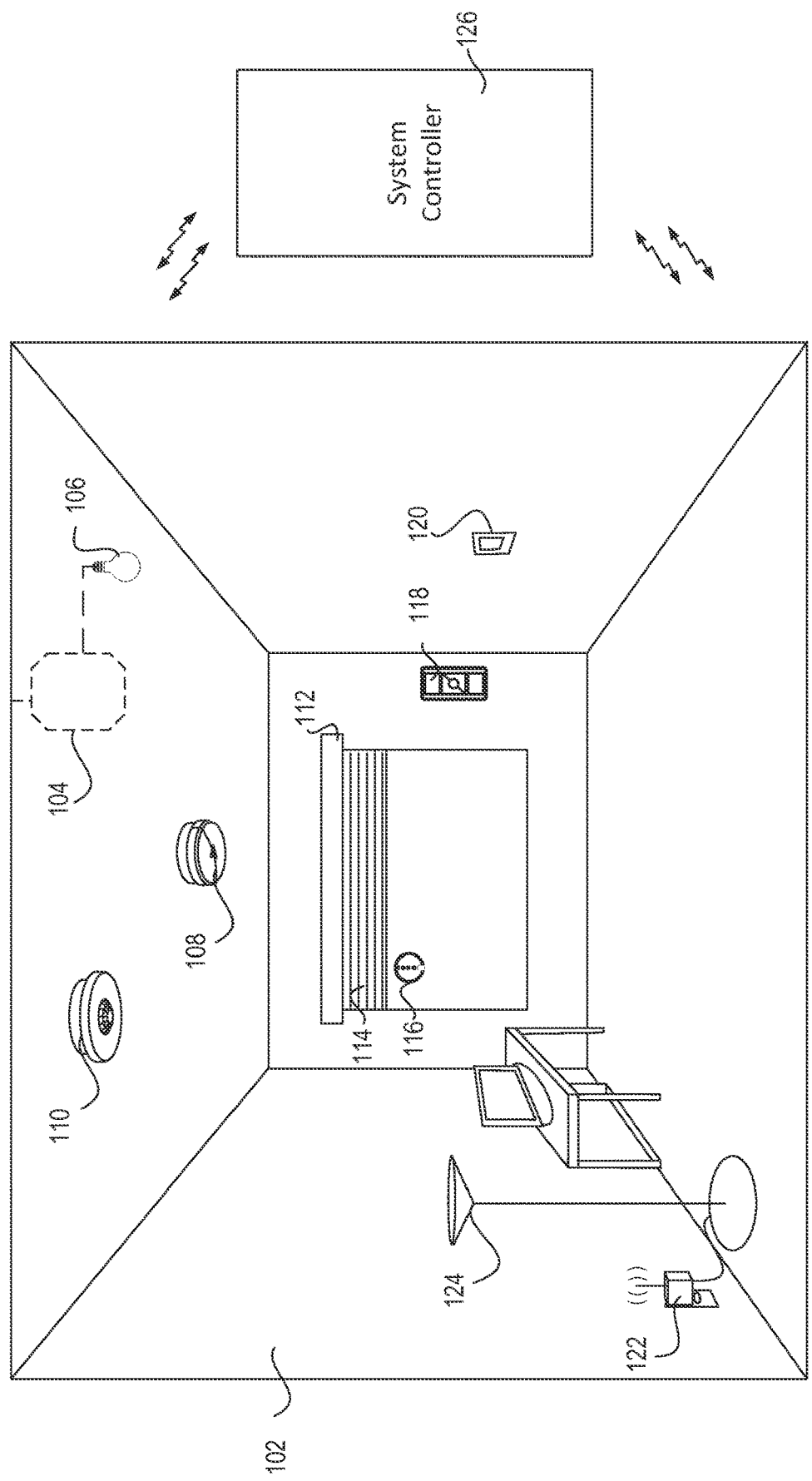
FIG. 1 depicts an example prior art environment for controlling electrical loads.
Figure 2A:
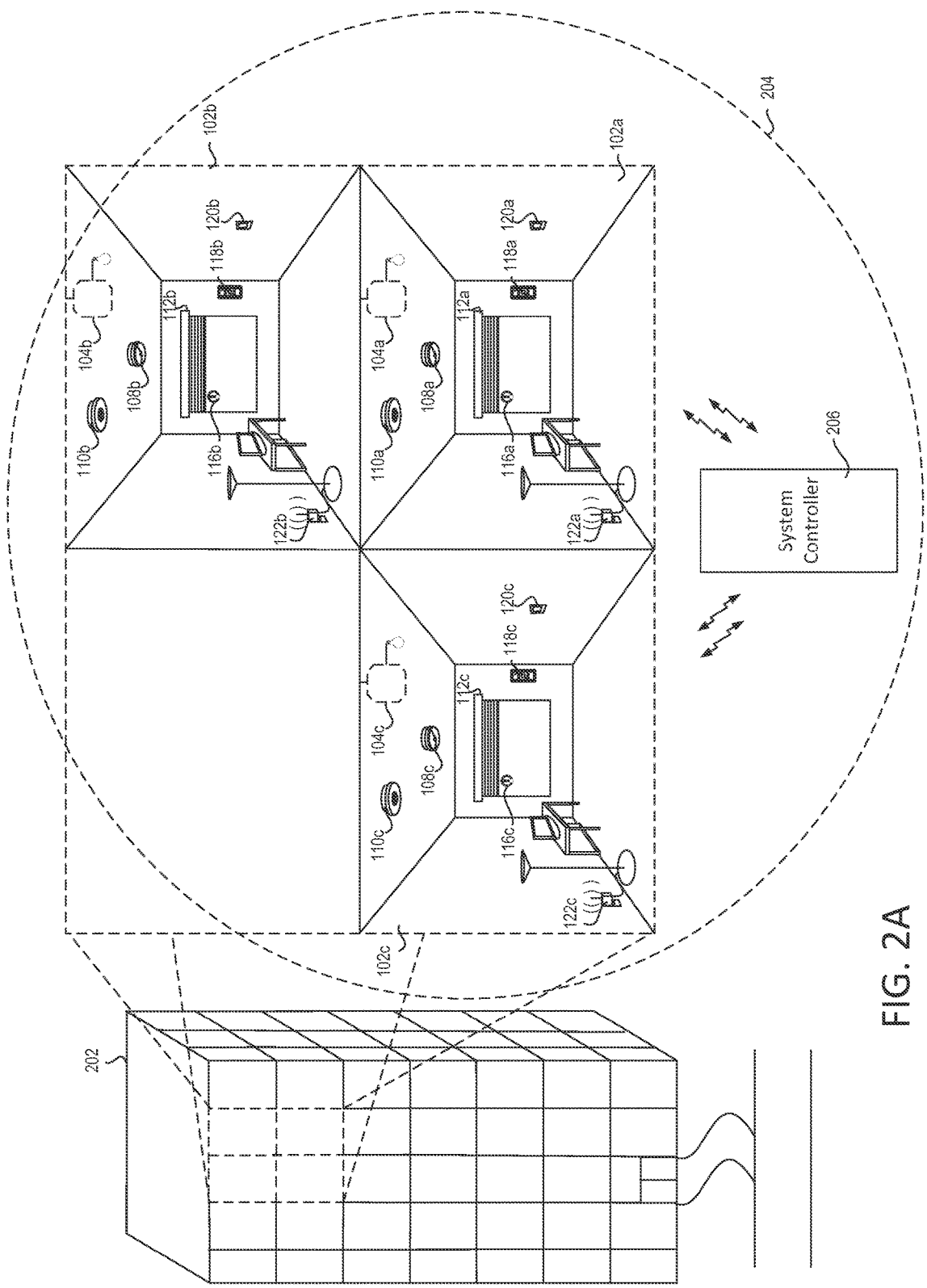
FIG. 2A depicts an example prior art environment in which interference can be caused by multiple communications transmitted for controlling electrical loads.
Figure 2B:
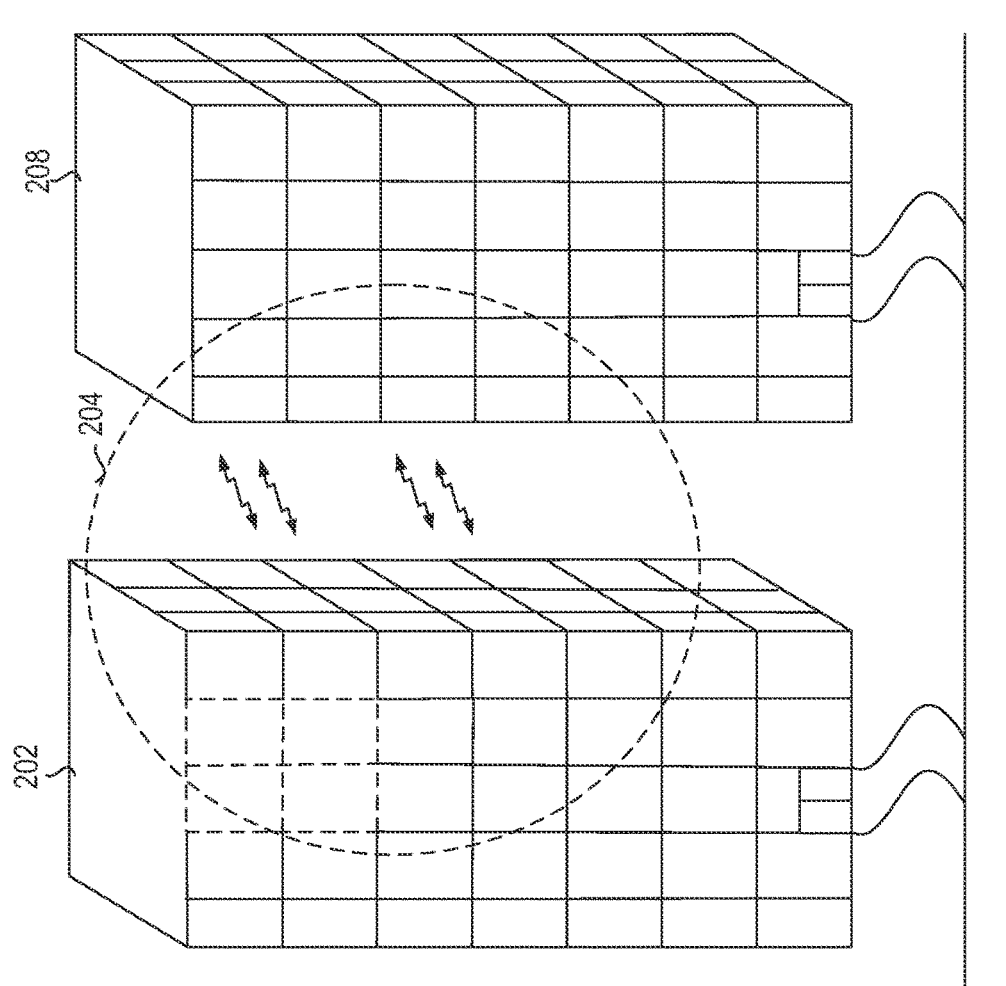
FIG. 2B depicts another example prior art environment in which interference can be caused by multiple communications transmitted for controlling electrical loads.
Figure 3A:
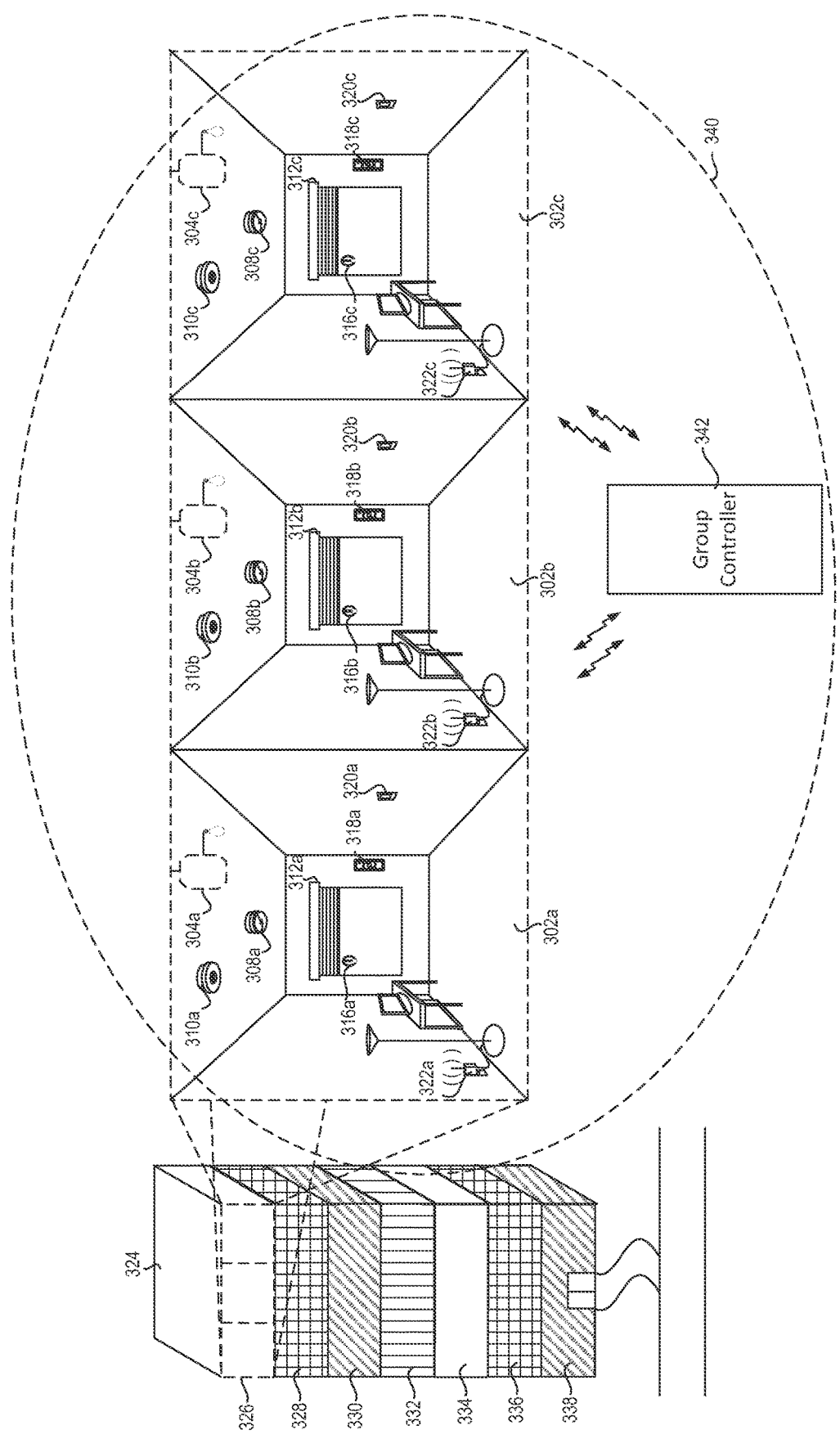
FIG. 3A is a diagram depicting an example environment for controlling electrical loads using channelization.

FIG. 3A is a diagram depicting an example environment for controlling electrical loads using channelization. As shown in FIG. 3A, load control environments 302*a*, 302*b*, 302*c* may include control devices that may communicate load control messages for controlling an electrical load at a load control device. Each load control environment 302*a*, 302*b*, 302*c* may include one or more wireless control devices, such as a daylight sensor 308*a*, 308*b*, 308*c*, an occupancy sensor 310*a*, 310*b*, 310*c*, a shadow sensor 316*a*, 316*b*, 316*c*, and/or a remote control device 318*a*, 318*b*, 318*c*. The load control environments 302*a*, 302*b*, 302*c* may include one or more load control devices, such as a lighting control device 304*a*, 304*b*, 304*c*, a motorized window treatment 312*a*, 312*b*, 312*c*, a thermostat 320*a*, 320*b*, 320*c*, and/or a plug-in load control device 322*a*, 322*b*, 322*c*. The load control devices may control corresponding electrical loads in response to load control messages received from the wireless control devices. For example, the wireless control devices may communicate with the load control devices by transmitting wireless signals, e.g., radio-frequency (RF) signals, including the load control messages.

The load control messages may be sent from a control device to a load control device for indirectly controlling an electrical load. The load control device may directly control the electrical load based on the load control message received from the control device. The control device may be referred to as a control-source device, as the control device may be the source of the load control message. The load control device may be referred to as a control-target device, as the load control device may be the target of the load control message. The control-target devices may be capable of receiving and/or implementing control instructions based on load control messages received from one or more control-source devices. A control device may be both a control-target and a control-source device. A control device may be a load control device itself or any other device capable of communicating load control messages for controlling a load control device.

The load control environments 302*a*, 302*b*, 302*c* may be included in a building 324. The building 324 may be a commercial building, a residence, or other structure. Load control environments 302*a*, 302*b*, and 302*c* may be on the same floor in the building 324. The building 324 may include one or more other floors that may include other load control environments having one or more control devices and/or one or more load control devices.

Each control device and/or load control device may be included in a load control group that may be used to communicate load control messages on the same communication channel or channels (e.g., using the same communication frequency or frequencies). A group configuration may include control devices and/or load control devices within the same load control environment or set of load control environments, such as load control environments 302*a*, 302*b*, 302*c*. The control devices and/or load control devices in a load control group may be on the same floor, in a group of consecutive floors, on different floors, or in another configuration within a wireless communication range 340 of a group controller 342 (e.g., a system controller or central controller).

Load control groups may be configured based on control device type, where each load control group may include one or more control devices of the same device type. For example, the occupancy sensors 310a, 310b, 310c may be included in a load control group, while the daylight sensors 308a, 308b, 308c may be included in another load control group. In another example, daylight sensors 308a, 308b, 308c and occupancy sensors 310a, 310b, 310c may be included in a group of sensing devices, along with shadow sensors 316a, 316b, 316c. Control devices capable of one-way communication within a defined area may also be included in a load control group. If different control devices are included in different load control groups, the control-target devices to which load control messages may be directed may communicate on multiple channels to receive load control messages. Load control groups may be configured based on load control device type, where each load control group may include one or more control devices capable of communicating with the same load control device type.

The control devices in load control environments 302a, 302b, 302c may be included in a load control group 326. The building 324 may include other load control groups 328, 330, 332, 334, 336, 338. Each of the other load control groups 328, 330, 332, 334, 336, 338 may include other control devices that may transmit load control messages to load control devices. The other load control groups 328, 330, 332, 334, 336, 338 may be on different floors in the building 324 from the load control group 326. Each of the load control groups 328, 330, 332, 336, 338 may be assigned a different communication channel than the load control group 326 for communicating load control messages.

Some load control groups may be assigned the same communication channel. For example, the load control group 334 may be assigned the same communication channel as the load control group 326. When more than one load control group is assigned the same channel, the groups may be separated to avoid interference between communications. As load control groups 326 and 334 may be assigned the same communication channel, the load control group 326 and the load control group 334 may be separated by one or more other groups, such as load control groups 328, 330 and 332, which may communicate on different wireless communication channels than load control groups 326 and 334. The load control groups 326, 328, 330 and 332 may communicate on consecutive channels, or channels having the same distance apart, within a wireless frequency band. The distance between each channel in the frequency band may be determined by dividing the wireless frequency band by the number of groups that may communicate on a different channel.

The distance between load control groups 326 and 334 may be a predefined distance configured based on the configuration of the load control system. In one example, the load control groups that are assigned the same communication channel may be separated by a number of floors (e.g., 5 floors) in the building 324. The distance between the load control groups may cause attenuation to load control messages being communicated. The distance between each floor may be between about 12 feet and about 14 feet. The building 324 may include steel, concrete, or other materials that may cause additional attenuation (e.g., 6 dB of attenuation) of the RF signals as the RF signals pass through each floor of the building.

As illustrated in FIG. 3A, the load control channels of the load control groups 326, 328, 330, 332, 334, 336, 338 may be assigned in a pattern. Groups 326, 328, 330, and 332 may be assigned different communication channels. Group 334 may begin the next iteration of the channel pattern assigned to groups 326, 328, 330, and 332. Group 334 may be assigned the same channel as group 326; group 336 may be assigned the same channel as group 328; and group 338 may be assigned the same channel as group 330. The groups may be assigned the same communication channel in a pattern to create a pre-determined amount of distance between different groups that may communicate on the same channel. While FIG. 3A shows load control groups that are assigned the same channel being separated by a number of floors in the building 324, the load control groups that are assigned the same channel may be separated by other load control groups on the same floor or any other distance to mitigate interference between load control messages transmitted between devices in different load control groups.

Control devices and/or load control devices may be assigned to the load control groups 326, 328, 330, 332, 334, 336, 338 at the time of manufacture or at the building 324 in which the load control devices may be installed. The devices within each load control group 326, 328, 330, 332, 334, 336, 338 may be configured to communicate on the assigned communication channel using a button press, a sequence of button presses, or a remote communication from a configuration device. If a device is assigned to a group at manufacture, the communication channel of the assigned group may be hard-coded during manufacture. The load control groups 326, 328, 330, 332, 334, 336, and 338 may be assigned communication channels based on the number of wireless communication channels available to the load control system. An example load control system may include sixteen channels that may be used for channelization.

The devices in load control groups 326, 328, 330, 332, 334, 336, and 338 may communicate load control messages directly or via the group controller 342. The communications between the devices in a load control group may be wireless or wired communications. The communications between the devices and the group controller 342 may be wireless or wired communications. The load control messages may include load control instructions or an indication of a status event from which load control instructions may be determined. The status event may indicate a status at a load control environment (e.g., an amount of light or an occupancy at the load control environment) or a status of a control device (e.g., a button press at the control device). The status event may include a user identified command, a measured light level in a load control environment, a detected movement or lack of movement within the a load control environment (e.g., an occupancy or vacancy condition), an amount of light directly received from outside of a load control environment, or another status event that may be used to control an electrical load. The group controller 342 may receive the indication of the status event and may determine load control instructions for being sent to one or more load control devices.

The group controller 342 may correspond to the devices of the load control group 326 or may communicate with load control devices of one or more of the other load control groups 328, 330, 332, 334, 336, 338. If the group controller 342 is dedicated to the load control group 326, the group controller 342 may communicate on the channel assigned to the load control group 326, while one or more other group controllers may communicate on the channel assigned to each of the other groups 328, 330, 332, 334, 336, 338. The group controllers may communicate with one another via a wired (e.g., Ethernet) or wireless communication link to send and/or receive information. If the group controller 342 communicates on the channel assigned to the load control group 326, it may also communicate on the channel assigned to the load control group 334. If the group controller 342 is not dedicated to the load control group 326, the group controller 342 may communicate on the channel assigned to one or more other load control groups 328, 330, 332, 336, 338 that may be in the wireless range 340 of the group controller 342.

The group controller 342 may configure the control devices and/or the load control devices to communicate on an assigned channel. The group controller 342 may send instructions to a device that indicate the channel on which the device may transmit and/or receive load control messages. The group controller 342 may send a broadcast message of the group assignments for the load control system and the control devices and/or the load control devices may individually determine their assigned load control groups and/or communication channel. In another example, the group controller 342 may send each device its group assignment and/or assigned communication channel.

Figure 3B:
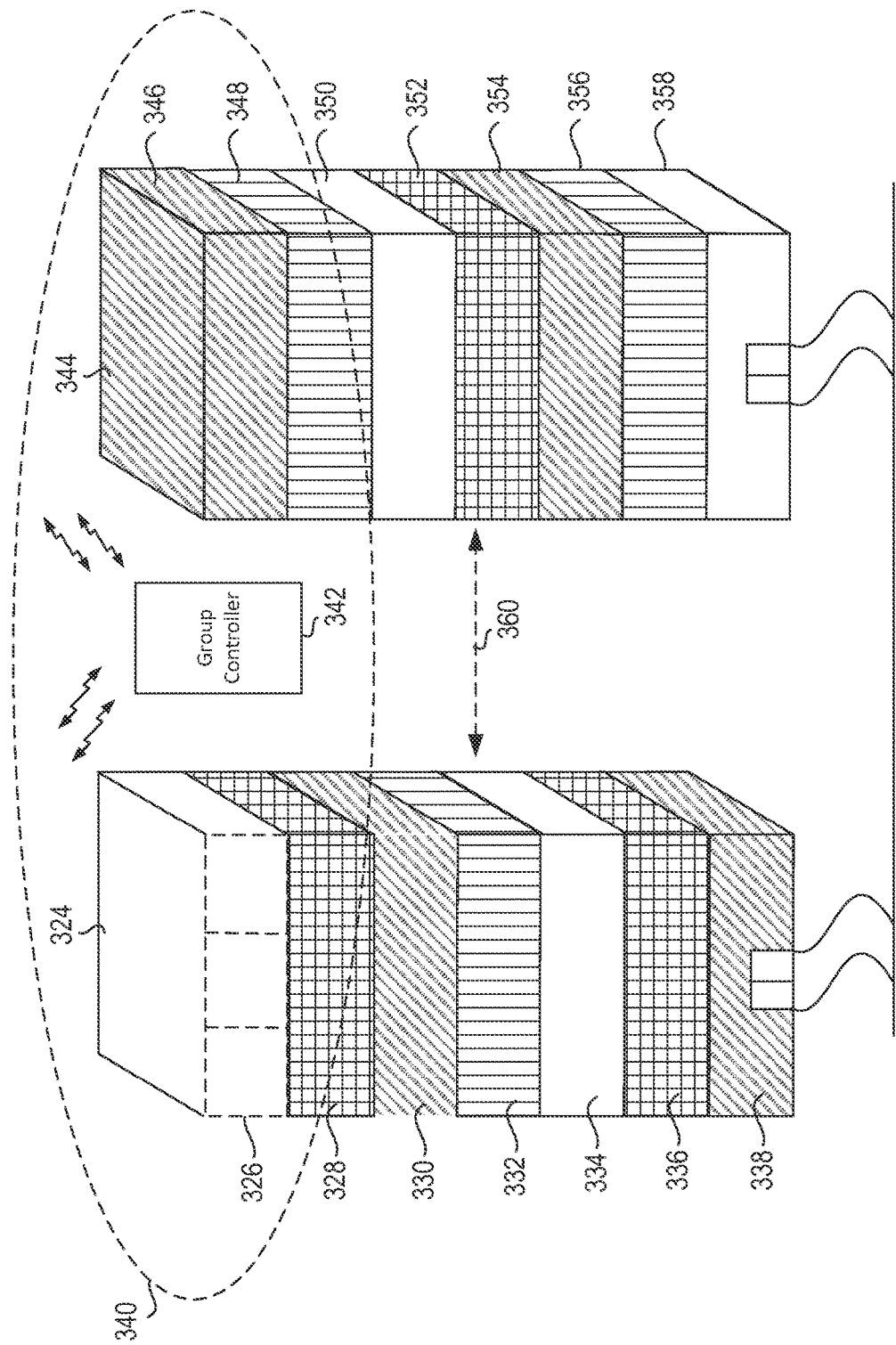
FIG. 3B is a diagram depicting another example environment for controlling electrical loads using channelization.

FIG. 3B is a diagram depicting another example environment for controlling electrical loads using channelization. As shown in FIG. 3B, the wireless range 340 of the group controller 342 within which the devices in the building 324 and/or the group controller 342 may communicate load control messages may also include devices in another building 344. The building 344 may include load control groups 346, 348, 350, 352, 354, 356, 358. The load control groups 346, 348, 350, 352, 354, 356, 358 may be on different floors in the building 344. While FIG. 3B shows the load control groups 346, 348, 350, 352, 354, 356, 358 occupying different floors in the building 344, each load control group 346, 348, 350, 352, 354, 356, 358 may occupy multiple floors, a portion of a floor, or another space in which load control communications may be transmitted or received.

The load control groups 346, 348, 350, 352, 354, 356, 358 in the building 344 may communicate on the same wireless communication channels as the load control groups 326, 328, 330, 332, 334, 336, 338 in the building 324. The load control groups 346, 348, 350, 352, 354, 356, 358 in the building 344 may be staggered differently than the load control groups 326, 328, 330, 332, 334, 336, 338 in the building 324 to avoid interference. As shown in FIG. 3B, the load control groups 346 and 348 may communicate load control messages on different communication channels than the other load control groups 326 and 328 that are in the wireless range 340.

The load control groups 326, 328, 330, 332, 334, 336, 338 and the load control groups 346, 348, 350, 352, 354, 356, 358 may be configured such that the load control groups that are assigned the same communication channel are not in the same wireless range. The communication channels to which the load control groups 346, 348, 350, 352, 354, 356, 358 are assigned may be in the same pattern as the communication channels to which the load control groups 326, 328, 330, 332, 334, 336, 338 are assigned. The load control groups may be staggered differently in building 344, such that the communication channels assigned to load control groups 346, 348, 350, 352, 354, 356, 358 are offset from the communication channels assigned to load control groups 326, 328, 330, 332, 334, 336, 338. This staggering may create a distance between different load control groups that are assigned the same communication channel.

The load control groups 346, 348, 350, 352, 354, 356, 358 in the building 344 may be staggered such that each load control group in the building 344 is at least a predefined distance from a load control group in the building 324 that communicates on the same wireless communication channel. For example, the load control groups in buildings 324 and 344 may be staggered by three to five floors to avoid interference between devices in different groups communicating on the same channel. The group configuration in the buildings 324 and 344 may depend on the distance 360 between the buildings. As the distance 360 increases, the number of floors between each load control group communicating on the same channel may decrease. As the distance 360 decreases, the distance (e.g., number of floors) between each load control group communicating on the same channel may increase. Due to the distance 360, the number of floors between the load control groups in the building 324 and the building 344 that communicate on the same channel (e.g., load control group 326 and load control group 350, respectively) may be less than the number of floors between load control groups in the same building 324 that communicate on the same channel (e.g., load control group 326 and load control group 334).

Figure 4:
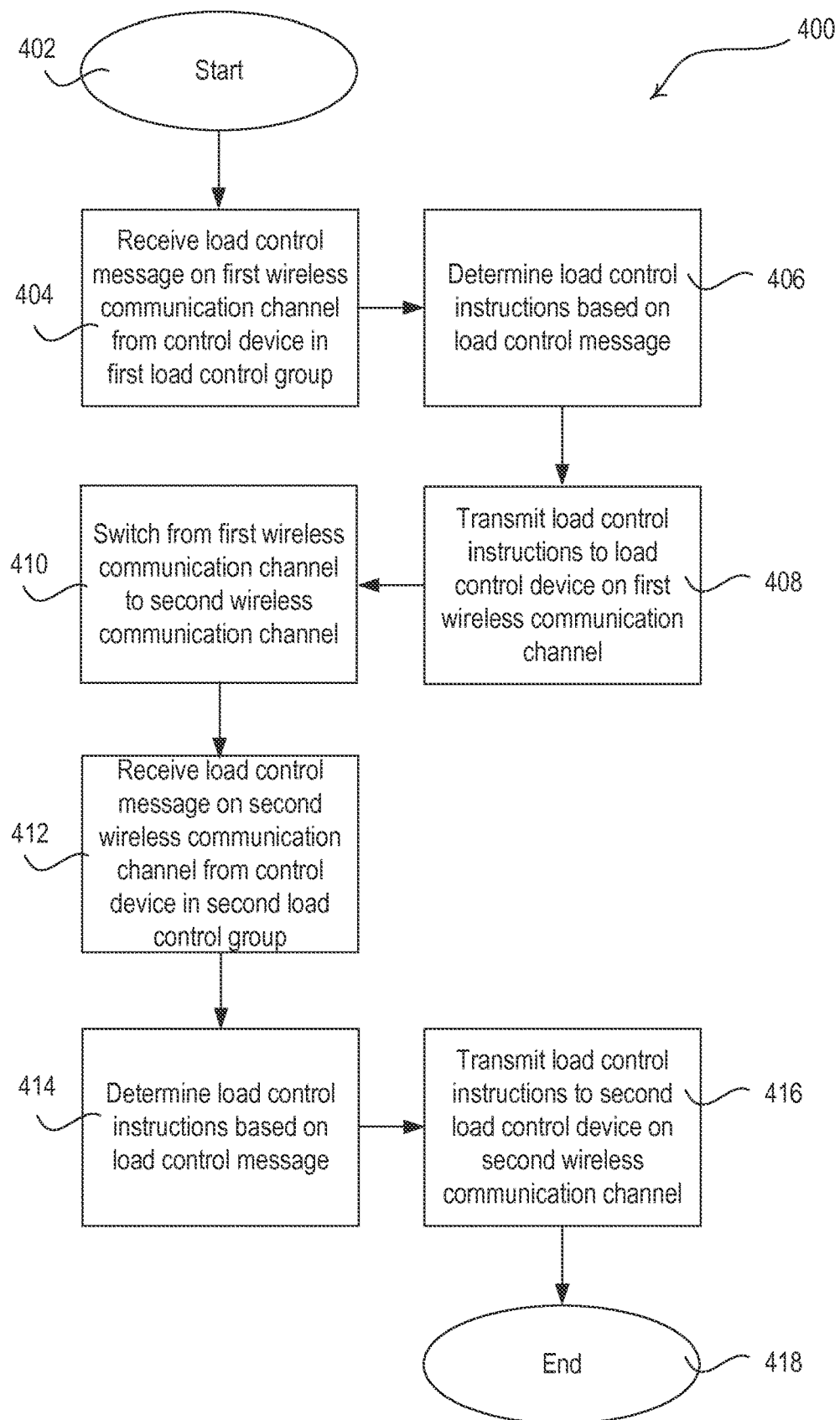
FIG. 4 is a simplified flow diagram illustrating an example method for performing channelization.

FIG. 4 is a simplified flow diagram illustrating an example method 400 for performing channelization. The method 400 may be performed by one or more group controllers (e.g., the group controller 342) or other devices that may communicate with one or more load control groups by communicating on multiple wireless communication channels. The method 400 may begin at 402. At 404, a load control message may be received from a control device in a first load control group. The load control message received at 404 may be received on a wireless communication channel assigned to the first load control group.

Load control instructions may be determined at 406 based on the load control message received at 404. The load control instructions may be determined based on a status event received in the load control message. The status event may indicate a status at a load control environment (e.g., an amount of light or an occupancy status) or a status of a control device (e.g., a button press). The status event may include a user identified command, a measured light level in a load control environment, a detected movement or lack of movement within a load control environment, an amount of light directly received from outside of a load control environment, or another status event that may be used to control an electrical load. The load control instructions may be transmitted to a load control device in the first load control group at 408. The load control instructions transmitted at 408 may be transmitted on the wireless communication channel assigned to the first load control group. At 410, the group controller may switch from the wireless communication channel assigned to the first load control group to a wireless communication channel assigned to a second load control group.

At 412, another load control message may be received on the wireless communication channel assigned to the second load control group. The wireless communication channel assigned to the second load control group may be different than the wireless communication channel assigned to the first load control group. The group controller may be switched from the wireless communication channel assigned to the first load control group to the wireless communication channel assigned to the second load control group before receiving the load control message at 412. In another example, the group controller may be capable of communicating on both channels simultaneously (e.g., dual communication via multiple antennas).

Load control instructions may be determined at 414 based on the load control message received at 412. The load control instructions may be determined based on a status event received in the load control message. The load control instructions may be transmitted to a load control device in the second load control group at 416. The load control instructions transmitted at 416 may be transmitted on the wireless communication channel assigned to the second load control group. The method 400 may end at 418.

Figure 5:
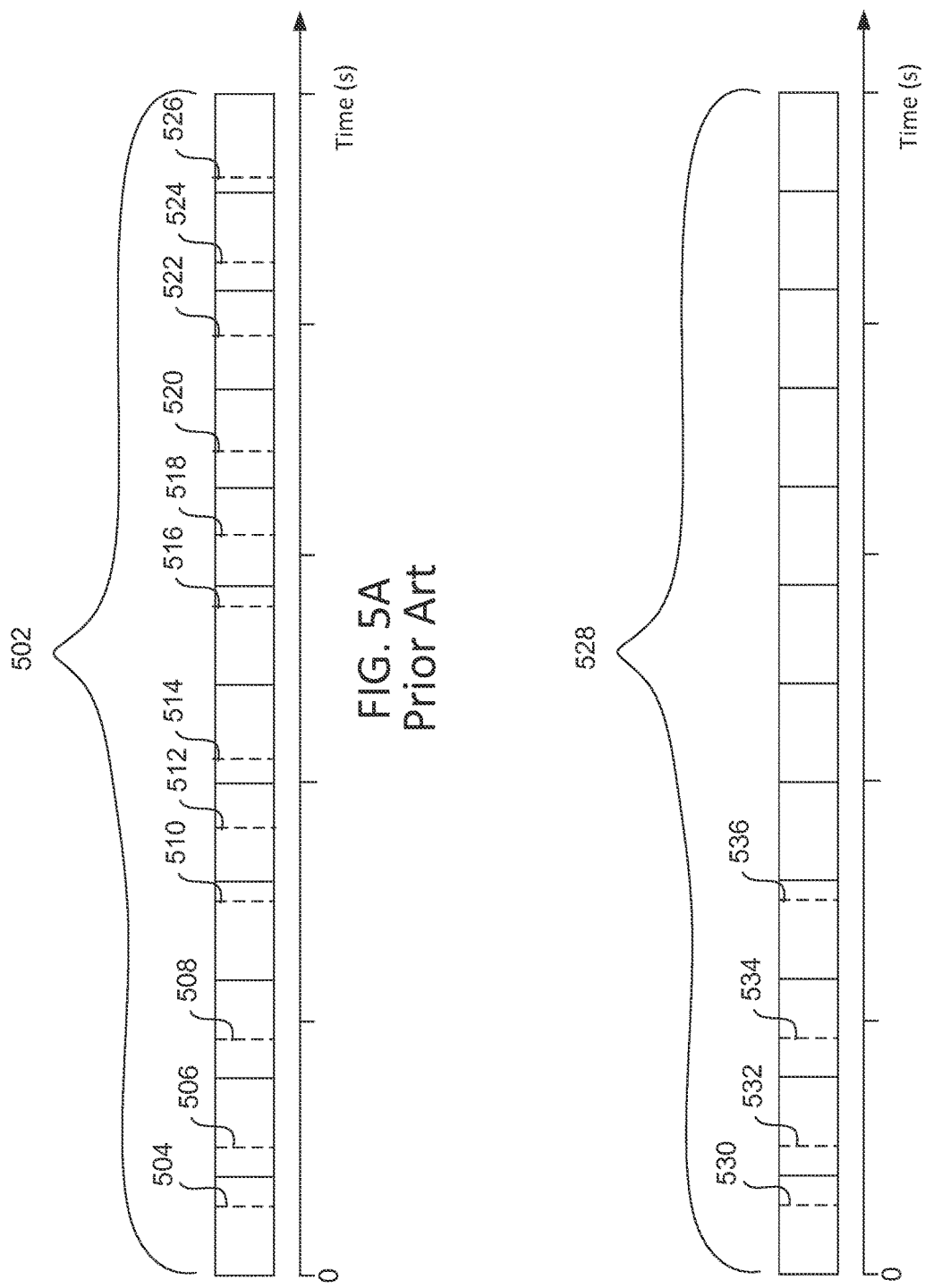
FIGS. 5A and 5B are diagrams depicting example prior art configurations for transmitting load control messages.

FIG. 5A is a diagram depicting an example prior art configuration for transmitting load control messages from an occupancy sensor (e.g., one of occupancy sensors 310a, 310b, 310c). An occupancy sensor may detect whether a load control environment is occupied or unoccupied and may send an updated status event. The updated status event may be used for controlling an electrical load when an occupancy status of the load control environment changes (e.g., from unoccupied to occupied).

The status event may be detected over a fifteen second sampling period. Upon expiration of the fifteen second sampling period, the occupancy sensor may detect an updated status event. When the updated status event is detected, twelve updated status event messages 504, 506, 508, 510, 512, 514, 516, 518, 520, 522, 524, 526 are transmitted within a transmission frame 502. The twelve updated status event messages 504, 506, 508, 510, 512, 514, 516, 518, 520, 522, 524, 526 are duplicate messages transmitted to increase the chance of at least one of the status event messages being properly received in case of interference. The updated status event messages 506, 508, 510, 512, 514, 516, 518, 520, 522, 524, 526 may be duplicates of a first updated status event message 504 that may be transmitted at the end of the previous sampling period.

The transmission frame 502 includes twelve sub-frames of equal length that are transmitted over a five second period of time allotted for transmitting the updated status events 504, 506, 508, 510, 512, 514, 516, 518, 520, 522, 524, 526. Each sub-frame lasts for a period of approximately 416 milliseconds. Each sub-frame includes thirty-two slots within which an updated status event can be transmitted. Each updated status event 504, 506, 508, 510, 512, 514, 516, 518, 520, 522, 524, 526 occurs in a respective sub-frame of the twelve sub-frames and is transmitted at a random slot within its respective sub-frame.

FIG. 5B is a diagram depicting an example prior art configuration for transmitting load control messages from a daylight sensor or a shadow sensor. A daylight sensor may measure an amount of light within a load control environment and may send an updated status event for controlling an electrical load when the level of the light within a load control environment changes, for example, by a predetermined amount. A shadow sensor may measure an amount of light received from outside of a load control environment and may send an updated status event for controlling an electrical load when the level of the light received from outside a load control environment changes, for example, by a predetermined amount.

The status event may be detected over a fifteen second sampling period. Upon expiration of the fifteen second sampling period, the daylight sensor or the shadow sensor may detect an updated status event. When an updated status event is detected, four updated status event messages 530, 532, 534, 536 are transmitted within a transmission frame 528. The four updated status event messages 530, 532, 534, 536 may be duplicate messages that are transmitted to increase the chance of at least one of the status event messages 530, 532, 534, 536 being properly received in case of interference. The updated status event messages 532, 534, 536 may be duplicates of a first updated status event message 530 that may be transmitted at the end of the previous sampling period.

The transmission frame 528 includes twelve sub-frames of equal length that are transmitted over a five second period of time allotted for transmitting the updated status events 530, 532, 534, 536. Each sub-frame lasts for over a period of approximately 416 milliseconds. Each sub-frame includes 32 slots within which an updated status event can be transmitted. The updated status events 530, 532, 534, 536 are transmitted within the first four sub-frames of the twelve sub-frames that make up the transmission frame 502. Each updated status event 530, 532, 534, 536 occurs in a respective sub-frame of the first four sub-frames and is transmitted at a random slot within its respective sub-frame. The four updated status events 530, 532, 534, 536 are transmitted over a period of approximately 1.66 seconds, while the other eight sub-frames (extending for about the next 3.33 seconds) go unused.

As the updated status events are transmitted based on a detected event (e.g., an occupancy condition or a measured light level), multiple devices tend to detect the same updated status and transmit an updated status event at the same time. As the number of devices detecting the same updated status in an area increases, the chance of message collisions increases. When other load control messages are also being transmitted from other devices on the same channel and within the same area, the chance of message collisions is even greater.

Figure 6:
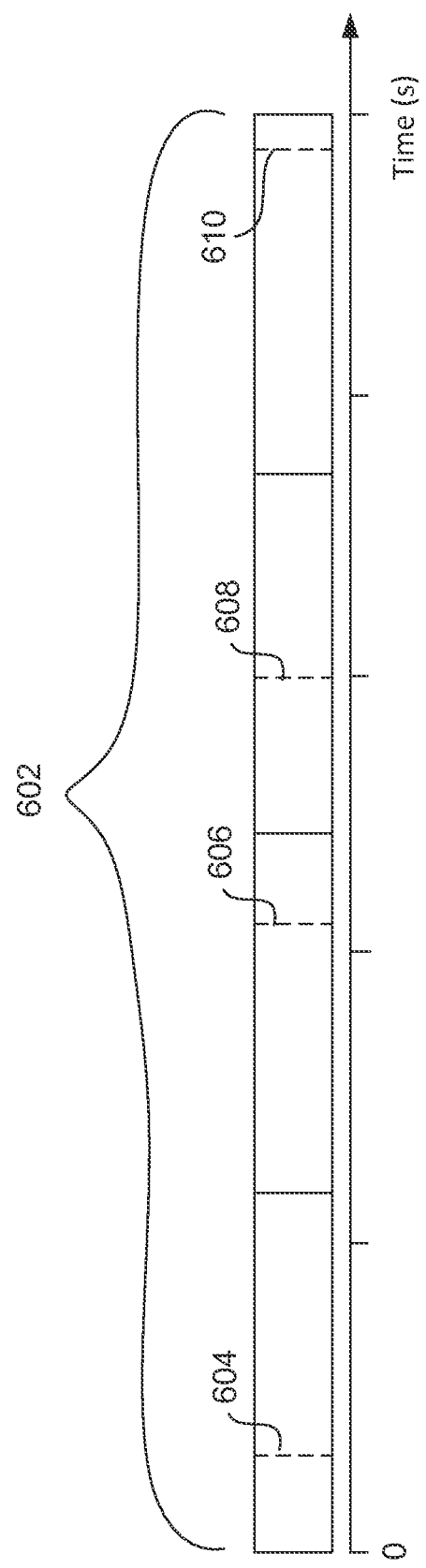
FIG. 6 is a diagram depicting an example configuration for transmitting load control messages.

FIG. 6 is a diagram depicting an example configuration for transmitting load control messages 604, 606, 608, 610. The load control messages 604, 606, 608, 610 may be transmitted by control devices, such as an occupancy sensor, a daylight sensor, a shadow sensor, a remote control device, or any other control device for controlling an electrical load. The load control messages 604, 606, 608, 610 may include a status event or other information for controlling a load control device. The status event may indicate a status at a load control environment (e.g., an amount of light or an occupancy condition) or a status of a control device (e.g., a button press). The status event may include a user identified command, a measured light level in a load control environment, a detected movement or lack of movement within a load control environment, an amount of light directly received from outside of the load control environment, or another status event that may be used to control an electrical load.

The load control messages 604, 606, 608, 610 may be transmitted within a transmission frame 602. The transmission frame 602 may include four sub-frames of equal length that may be transmitted over a transmission time period allotted for transmitting the load control messages 604, 606, 608, 610. The transmission time period may include a five second period of time. Each sub-frame may be transmitted over a period of approximately 1.25 seconds. Each sub-frame includes 128 slots within which a load control message may be transmitted. The updated load control messages 604, 606, 608, 610 may be transmitted at a random slot within a respective sub-frame within the transmission frame 602. Each of the four sub-frames of the transmission frame 602 may include a respective load control message 604, 606, 608, 610. The transmission frame 602 may be followed by one or more other transmission frames that are configured in a similar manner to transmission frame 602.

The load control messages 604, 606, 608, 610 may be transmitted randomly within the four 128-slot sub-frames within the transmission frame 602 to mitigate collisions between load control messages. The transmission of four load control messages 604, 606, 608, 610 may decrease the chance of collisions that may occur when more messages are transmitted. The 128-slot sub-frame may allow for a lower chance of collision with other messages that may be transmitted randomly within the same sub-frame.

Figure 7:
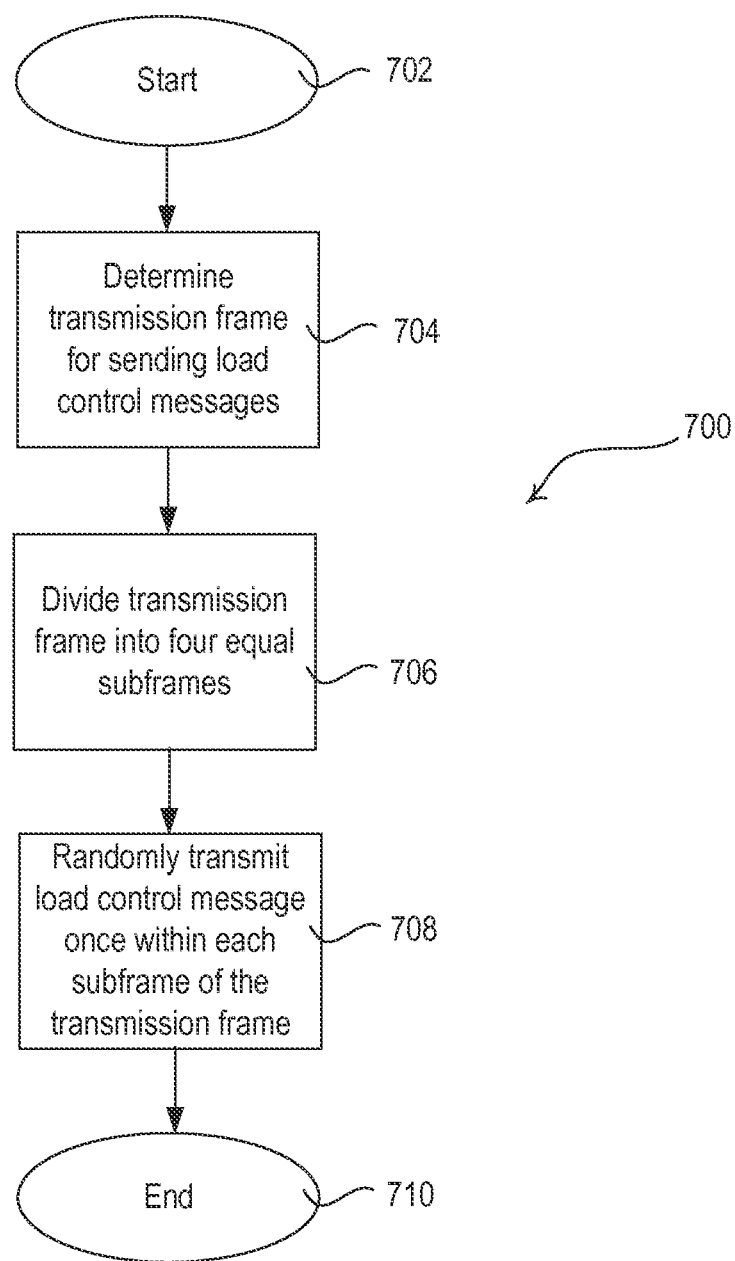
FIG. 7 is a simplified flow diagram illustrating an example method for transmitting load control messages.

FIG. 7 is a simplified flow diagram illustrating an example method 700 for transmitting load control messages. The method 700 may be performed by a control device or another device that may communicate load control messages within a load control system. The method 700 may begin at 702. At 704, a transmission frame may be established for sending load control messages from a control device. The transmission frame may have a length that may be configured in a control device at manufacture, or that may be received by a control device after manufacture (e.g., after installation at a site). The transmission frame may be determined at 704 to be communicated over a five second period of time.

The transmission frame may be divided into four equal sub-frames at 706. Each sub-frame may include 128 slots for transmitting a load control message. At 708, the load control message may be transmitted at a random slot once within each sub-frame of the transmission frame. The transmission frame transmitted at 708 may be followed by another transmission frame of four equally-sized sub-frames that each include a respective load control message (not shown). If another transmission frame is sent after the transmission frame sent at 708, the control device may return to any of the steps 704, 706, or 708 to begin processing the subsequent frame. The method 700 may end at 710.

Figure 8A:
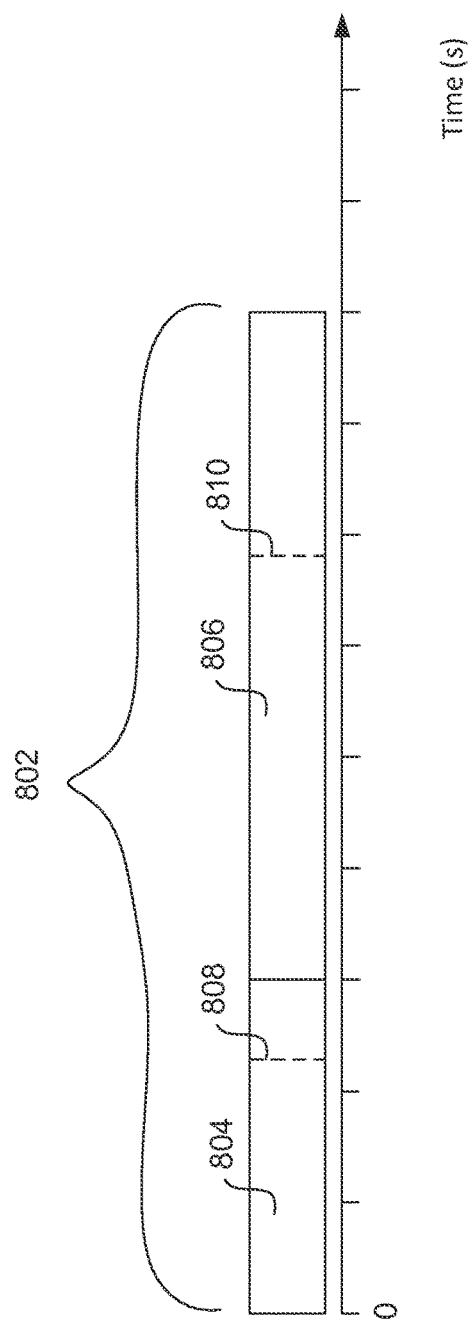
FIGS. 8A and 8B are diagrams depicting example configurations for detecting status events and transmitting load control messages over a detection and reporting period.
Figure 8B:
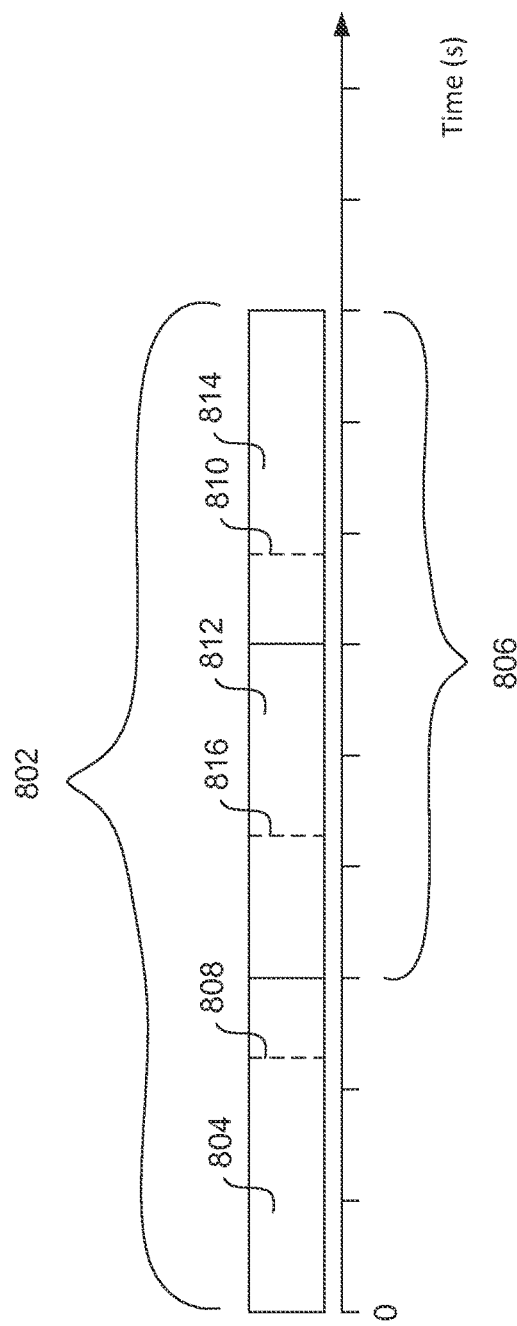

FIGS. 8A and 8B are diagrams that depict example configurations for detecting status events and transmitting load control messages over a detection and reporting period 802. The detection and reporting period 802 may include a sampling time interval 804 within which a status event 808 may be detected at a control device. The control device may include an occupancy sensor, a daylight sensor, a shadow sensor, a remote control device, or other control device capable of detecting the status event. The detection and reporting period 802 may include a transmission time interval 806 within which a load control message 810 may be transmitted. The load control message 810 may be a load control message (e.g., a first load control message) in a transmission frame, such as the transmission frame 602 for example, that includes duplicate load control messages. The load control message 810 may include the status event 808 and/or load control information determined based on the status event 808. The status event 808 may include a user identified command, a detected level of available daylight in a load control environment, a detected movement or lack of movement within a load control environment, an amount of light directly received from outside of a load control environment, or another status event that may be used to control an electrical load. The information based on the status event 808 may include load control instructions for turning a lighting load on/off, load control instructions for increasing/decreasing a dimming level of a lighting load, load control instructions for increasing/decreasing a position of a window covering material, load control instructions for increasing/decreasing a temperature of an HVAC system, and/or the like.

As shown in FIG. 8A, the length of the transmission time interval 806 may be larger than the length of the sampling time interval 804. The transmission time interval 806 may be a multiple of the sampling time interval 804. For example, the sampling time interval 804 may be a fifteen-second time interval for detecting the status event 808 and the transmission time interval 806 may be a thirty-second time interval for transmitting the load control message 810. Upon detection of the status event 808, or at the end of the sampling time interval 804, the status event 808, or information determined from the status event 808, may be included in the load control message 810. The load control message may be transmitted at a random time within the transmission time interval 806.

As shown in FIG. 8B, the transmission time interval 806 may overlap with one or more other sampling time intervals, such as sampling time intervals 812, 814. The sampling time intervals 812, 814 may follow the sampling time interval 804 and may be used for detecting additional status events. In the sampling time interval 812, the control device may detect a status event 816. The status event 816 may be detected before the load control message 810 is transmitted. If the status event 816 is detected, and/or the sampling time interval 812 expires, before the load control message 810 is randomly transmitted within the transmission time interval 806, the control device may determine whether the status event 816 is an updated status event from the status event 808. The status event 816 may be an updated status event if it indicates different status information than the status event 808.

The load control message 810 may be modified and/or the transmission of the load control message 810 may be changed or prevented based on the detection of the status event 816. If the status event 816 is not an updated status event, the control device may send the load control message 810 unaltered. If the status event 816 is an updated status event, the control device may alter the load control message 810 based on the updated status event 816 or cancel the transmission of the load control message 810 within the transmission time interval 806. The altered load control message 810 may still be randomly transmitted within the transmission time interval 806 or transmission may be delayed until the next transmission time interval. If the updated status event 816 indicates a status that existed before the status event 808 was detected, the transmission of the load control message 810, or any other load control message associated with the status event 808, may be prevented altogether. This may allow a reduction in the overall bandwidth being used, as multiple status events 808 and 816 may be communicated with a single load control message 810, or the transmission of the load control message 810 may be prevented by the detection of an updated status event 816 that may indicate the same status that existed prior to detection of the status event 808 (e.g., an interim short-lived status event).

The sampling time interval 804 and/or the transmission time interval 806 may be offset across multiple devices, such that communications based on detected status events may avoid collisions. The sampling time interval 804 and/or the transmission time interval 806 may be offset by a different timing at an internal clock on which the sampling time interval 804 and/or the transmission time interval 806 may be based. The internal clocks on each device may drift at different rates and may move apart from one another over time, and/or may be set at different times.

Figure 9A:
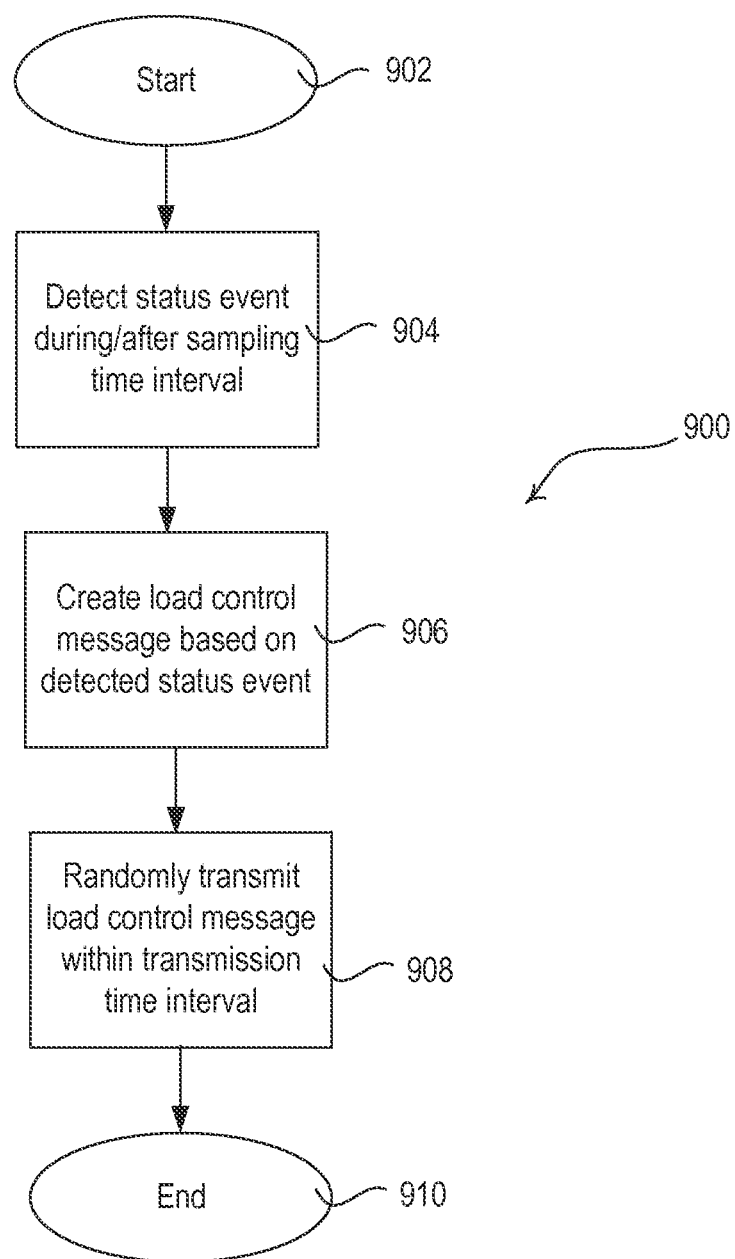
FIG. 9A is a simplified flow diagram illustrating an example method for detecting a status event and transmitting a load control message based on the status event.

FIG. 9A is a simplified flow diagram illustrating an example method 900 for detecting a status event and transmitting a load control message based on the status event. The method 900 may be performed by a control device or another device in a load control system capable of detecting a status event. The method 900 may begin at 902. At 904, a status event may be detected during or after a sampling time interval. The status event may indicate a status at a load control environment (e.g., an amount of light or an occupancy condition) or a status of a control device (e.g., a button press). The sampling time interval may be a fifteen-second time interval.

A load control message may be created at 906 based on the status event detected at 904. The load control message may include updated status information or may indicate that the status of the load control environment is unchanged. The load control message created at 906 may be transmitted at a random time within a transmission time interval at 908. The load control message may be a first load control message in a transmission frame, such as transmission frame 602 for example, that includes duplicate load control messages. The transmission time interval may follow the sampling time interval. The transmission time interval may be a multiple of the sampling time interval. For example, if the length of the sampling time interval is fifteen seconds, the transmission time interval may be a thirty-second time interval. The load control message may be transmitted at a random time within the transmission time interval to avoid interference with other load control messages within the load control system. For example, other control devices in the load control system may be transmitting load control messages based on the same status event detected at 904. The method 900 may end at 910.

Figure 9B:
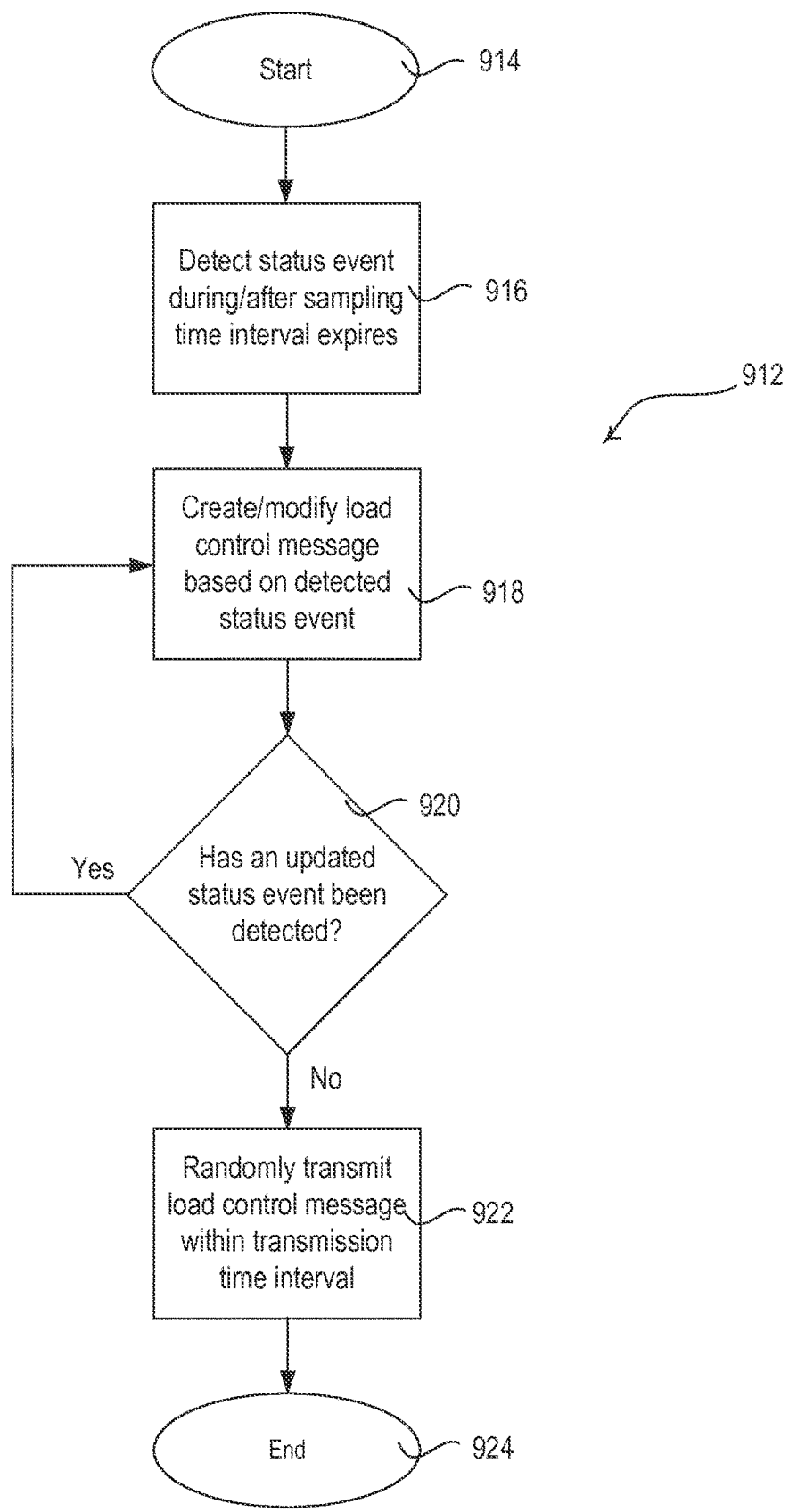
FIG. 9B is a simplified flow diagram illustrating an example method for detecting a status event and determining whether to transmit a load control message based on detection of another status event.

FIG. 9B is a simplified flow diagram illustrating an example method 912 for detecting a status event and determining whether to transmit a load control message based on detection of another status event. The method 912 may be performed by a control device or another device in a load control system capable of detecting a status event. The method 912 may begin at 914. At 916, a status event may be detected during or after a sampling time interval. A load control message may be created at 918 based on the status event detected at 916. The load control message may include updated status information or may indicate that the status of the load control environment is unchanged.

A control device may determine whether an updated status event has been detected at 920. For example, the next sampling time interval may overlap with the transmission time interval for transmitting the load control message based on the detected status event. The transmission time interval may include multiple sampling time intervals. If an updated status event is detected at 920, the method 912 may return to 918 and may modify the load control message or create a different load control message based on the detected updated status event. Transmission of the load control message based on the updated status event may be delayed until the next transmission time interval or may be transmitted within the same transmission time interval in which it is detected. If an updated status event is not detected at 920, or another updated status event is not detected after modification of the control message at 918, the load control message may be transmitted at a random time within the transmission time interval at 922. The method 912 may end at 924.

Figure 9C:
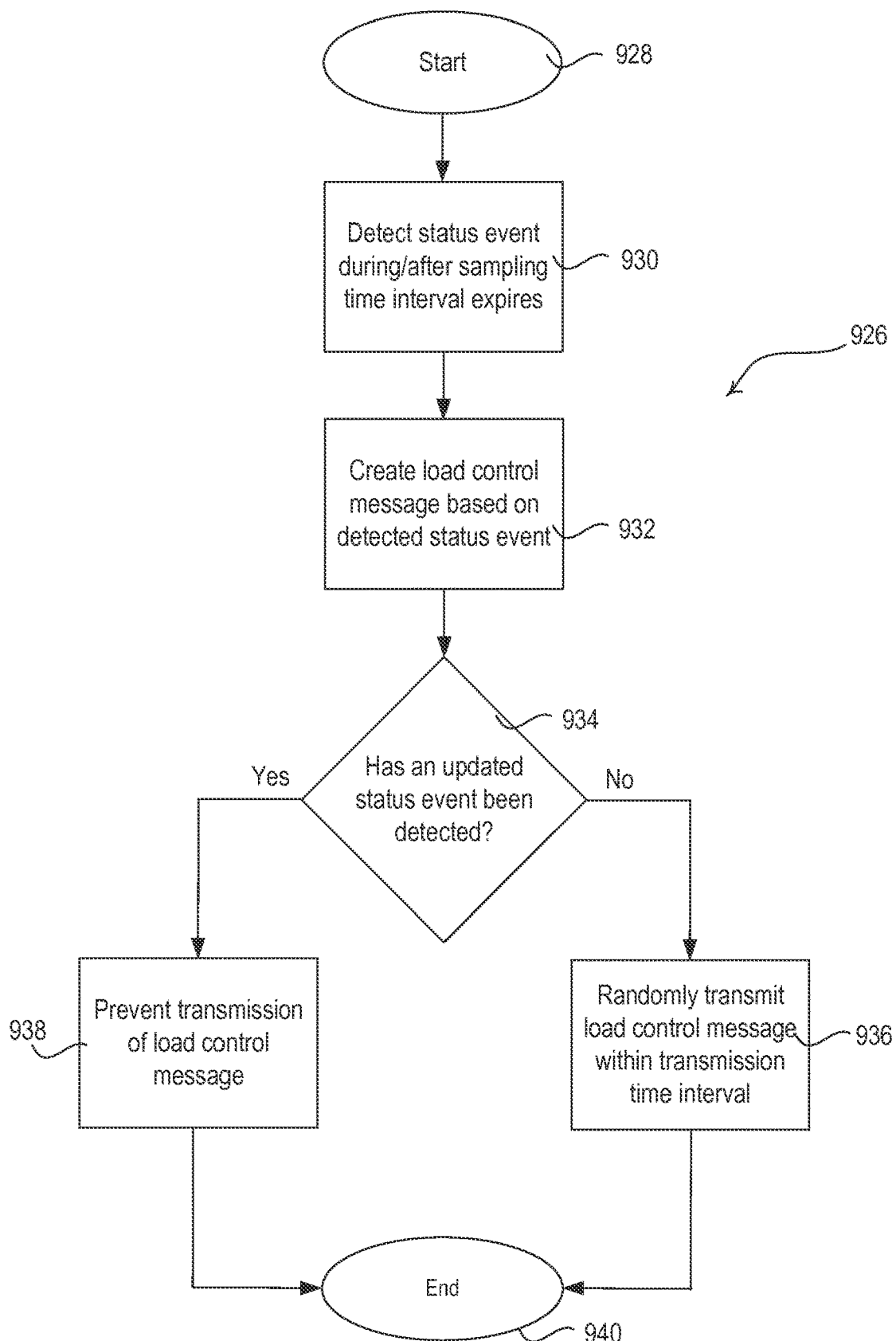
FIG. 9C is a simplified flow diagram illustrating another example method for detecting a status event and determining whether to transmit a load control message based on detection of another status event.

FIG. 9C is a simplified flow diagram illustrating an example method 926 for detecting a status event and determining whether to transmit a load control message based on detection of a subsequent status event. The method 926 may be performed by a control device or another device in a load control system capable of detecting a status event. The method 926 may begin at 928. At 930, a status event may be detected during or after a sampling time interval. A load control message may be created at 932 based on the status event detected at 930.

A control device may determine whether an updated status event has been detected at 934. For example, the determination at 934 may be made before transmission of the load control message. If the updated status event is not detected at 934 before the transmission of the load control message, the load control message may be randomly transmitted within the transmission time interval at 936. If an updated status event is detected at 934, the transmission of the load control message may be prevented at 938. For example, the updated status event detected at 934 may be compared with a status event prior to the status event detected at 930 and if the updated status event detected at 934 indicates the same status that existed prior to the status event detected at 930, the transmission of the load control message may be prevented at 938. The transmission of the load control message may be prevented at 938 because the load control message based on the updated status event detected at 934 may include similar information or instructions that are currently being used to control an electrical load. In another example, the transmission of the load control message may be prevented at 938 in favor of being transmitted in a later transmission time interval. The method 926 may end at 940. While FIGS. 9B and 9C illustrate the creation of the load control message at 918 and 932, respectively, before determining whether an updated status event has been detected, the load control message may be created after an updated status event has been detected. For example, the load control message may be created at 918 and 932 after it is determined at that a load control message should be transmitted at 922 and 936, respectively.

Figure 10:
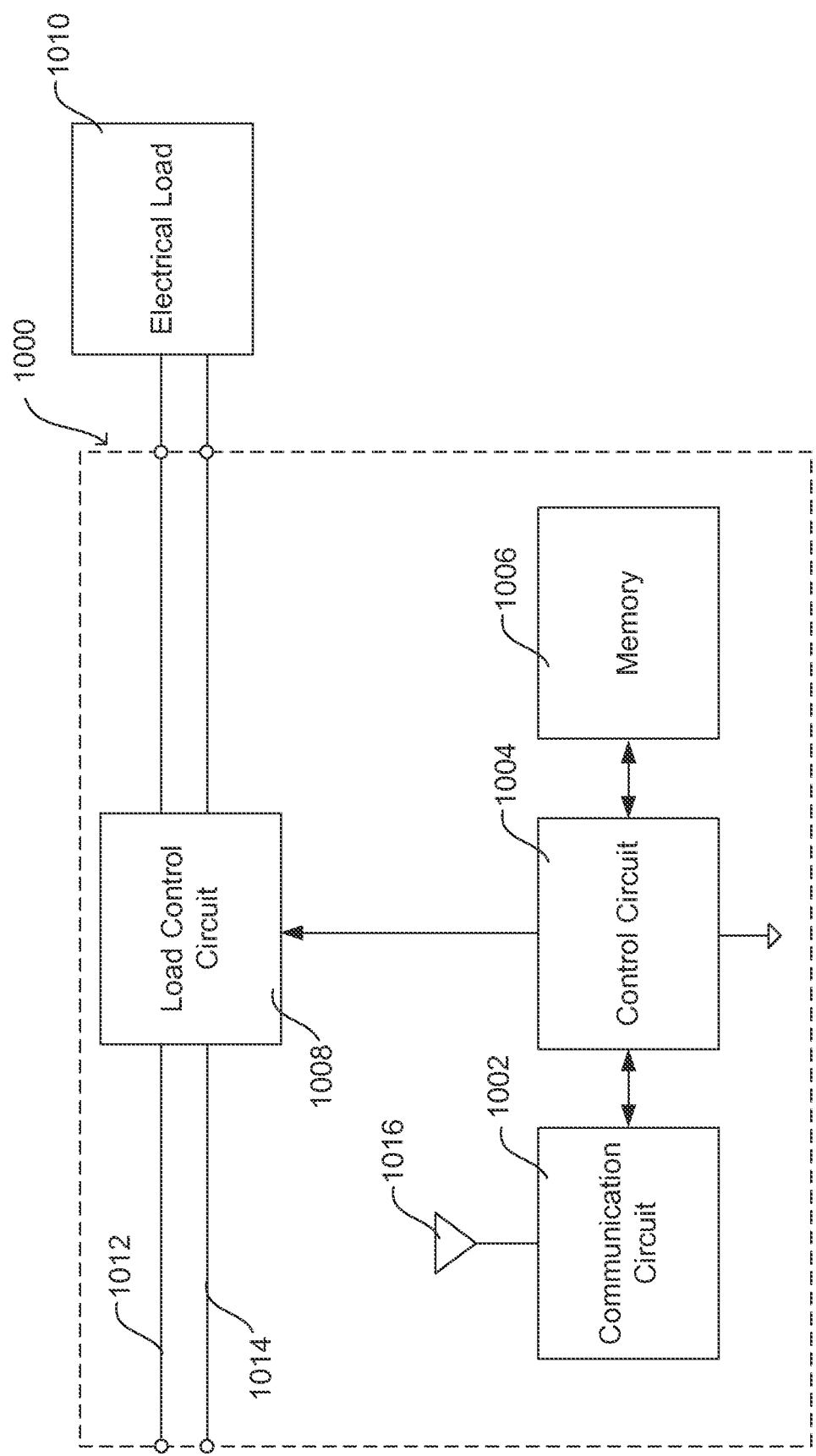
FIG. 10 a block diagram depicting an example load control device.

FIG. 10 is a block diagram depicting an example load control device 1000. The load control device 1000 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device capable of directly controlling an electrical load. The load control device 1000 may include a communication circuit 1002. The communication circuit may perform wired and/or wireless communications with other devices. The communications circuit 1002 may include a radio-frequency (RF) receiver, an RF transceiver, or other communications module capable of performing wireless communications via an antenna 1016. The communications circuit 1002 may be in communication with control circuit 1004 for transmitting and/or receiving information.

The control circuit 1004 may include one or more general purpose processors, special purpose processors, conventional processors, digital signal processors (DSPs), microprocessors, integrated circuits, a programmable logic device (PLD), application specific integrated circuits (ASICs), or the like. The control circuit 1004 may perform signal coding, data processing, power control, input/output processing, or any other functionality that enables the load control device 1000 to perform as described herein.

The control circuit 1004 may store information in and/or retrieve information from a memory 1006. The memory 1006 may maintain a registry of associated control devices and/or group controllers with which the load control device 1000 may communicate. The memory 1006 may maintain a registry of load control groups and/or associated communication channels on which load control messages may be received. The memory 1006 may include a non-removable memory and/or a removable memory.

The load control circuit 1008 may control the electrical load 1010 in response to the control circuit 1004. The load control circuit 1008 may receive power via the hot connection 1012 and the neutral connection 1014 and may provide an amount of power to the electrical load 1010. The electrical load 1010 may include any type of electrical load.

Figure 11:
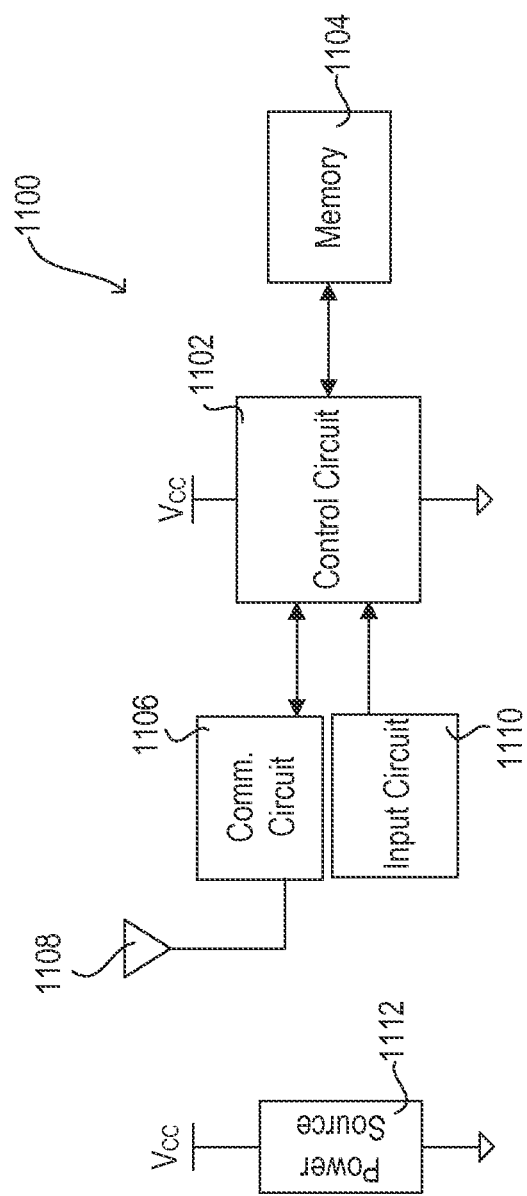
FIG. 11 a block diagram depicting an example control device.

FIG. 11 is a block diagram depicting an example wireless communication device 1100. The wireless communication device 1100 may be a control device or a group controller device as described herein. The wireless communication device 1100 may include a control circuit 1102 for controlling the functionality of the wireless communication device 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, power control, input/output processing, or any other functionality that enables the wireless communication device 1100 to perform as described herein.

The control circuit 1102 may store information in and/or retrieve information from the memory 1104. The memory 1104 may include a non-removable memory and/or a removable memory. The memory 1104 may maintain a registry of associated load control devices and/or group controllers with which the wireless communication device 1100 may communicate. The memory 1104 may maintain a registry of load control groups and/or associated communication channels on which load control messages may be transmitted. Transmission frame configurations, sampling time intervals, and/or transmission time intervals may be maintained in the memory 1104.

The wireless communication device 1100 may include a communications circuit 1106 for transmitting and/or receiving information. The communications circuit 1106 may transmit and/or receive information via wired and/or wireless communications. The communications circuit 1106 may include an RF transmitter, an RF transceiver, or other circuit capable of performing communications via an antenna 1108. The communications circuit 1106 may be in communication with control circuit 1102 for transmitting and/or receiving information.

The control circuit 1102 may also be in communication with an input circuit 1110. The input circuit 1110 may include a button or a sensor circuit (e.g., an occupancy sensor circuit, a daylight sensor circuit, or a temperature sensor circuit) for receiving input that may be sent to a device for controlling an electrical load. The control circuit 1102 may receive information from the input circuit 1110 (e.g., an indication that a button has been actuated or sensed information). The control circuit 1102 may retrieve load control instructions from the memory 1104 based on the information received from the input circuit 1110. The control circuit 1102 may send the information received from the input circuit 1110 to another device via the communications circuit 1106. Each of the modules within the wireless communication device 1100 may be powered by a power source 1112.

Although features and elements are described herein in a particular sequence or in combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed:

1. An apparatus, comprising:
control circuitry to:
receive an indication of a first status event during a first sampling time interval;
generate a first message responsive to the indication of the first status event;
randomly select at least one transmission time within a transmission time interval;
receive an indication of a second status event during a second sampling time interval prior to the randomly selected at least one transmission time; and
responsive to the indication of the second status event, determine whether a similarity exists between the first status event and the second status event;
responsive to the determination that the first status event and the second status event are similar, cause a transmission of the first message to a network connected system controller; and
responsive to the determination that the first status event and the second status event are dissimilar, cause:
a generation of a second message based at least on the indication of the second status event and a transmission of the second message to the network connected system controller; and
an abortion of a transmission of the first message to the network connected system controller.

2. The apparatus of claim 1 wherein to cause the generation of the second message, the control circuitry to further cause:
a modification of the first message to generate the second message.

3. The apparatus of claim 1:
wherein to receive the indication of the first status event during the first sampling time interval, the control circuitry to further:
receive, from first input circuitry, the indication of the first status event during the first sampling time interval; and
wherein to receive the indication of the second status event during the second sampling time interval prior to the randomly selected at least one transmission time, the control circuitry to further:
receive, from the first input circuitry, the indication of the second status event during the second sampling time interval.

4. The apparatus of claim 1:
wherein to receive the indication of the first status event during the first sampling time interval, the control circuitry to further:
receive, from first input circuitry, the indication of the first status event during the first sampling time interval; and
wherein to receive the indication of the second status event during the second sampling time interval prior to the randomly selected at least one transmission time, the control circuitry to further:

receive, from second input circuitry different from the first input circuitry, the indication of the second status event during the second sampling time interval.

5. The apparatus of claim 1:
wherein the transmission time interval comprises a plurality of transmission time sub-intervals; and
wherein to randomly select the at least one transmission time within the transmission time interval, the control circuitry to further:
randomly select a transmission time in each respective one of the plurality of transmission time sub-intervals.

6. The apparatus of claim 5 wherein to cause the transmission of the first message to the network connected system controller, the control circuitry to further:
cause a transmission of the first message to the network connected system controller at each of the randomly selected transmission times in each of the plurality of transmission time sub-intervals.

7. The apparatus of claim 5 wherein to cause the transmission of the second message to the network connected system controller, the control circuitry to further:
cause a transmission of the second message to the network connected system controller at each of the randomly selected transmission times in each of the plurality of transmission time sub-intervals.

8. A method, comprising:
receiving, by processor circuitry, an indication of a first status event during a first sampling time interval;
generating, by the processor circuitry, a first message responsive to the indication of the first status event;
randomly selecting, by the processor circuitry, at least one transmission time within a transmission time interval;
receiving, by the processor circuitry, an indication of a second status event during a second sampling time interval prior to the randomly selected at least one transmission time; and
responsive to the indication of the second status event, determining, by the processor circuitry, whether a similarity exists between the first status event and the second status event;
responsive to the determination that the first status event and the second status event are dissimilar:
causing, by the processor circuitry:
a generation of a second message based at least on the indication of the second status event and a transmission of the second message to a network connected system controller; and
an abortion of a transmission of the first message to the network connected system controller.

9. The method of claim 8 further comprising, responsive to the determination that a similarity exists between the first status event and the second status event:
causing, by the processor circuitry, a transmission of the first message to the network connected system controller.

10. The method of claim 9 wherein causing a generation of the second message further comprises:
causing a modification, by the processor circuitry, of the first message to generate the second message.

11. The method of claim 8:
wherein receiving the indication of the first status event during the first sampling time interval further comprises:
receiving, by the processor circuitry, from first input circuitry, the indication of the first status event during the first sampling time interval; and
wherein receiving the indication of the second status event during the second sampling time interval prior to the randomly selected at least one transmission time further comprises;
receiving, by the processor circuitry, from the first input circuitry, the indication of the second status event during the second sampling time interval.

12. The method of claim 8:
wherein receiving the indication of the first status event during the first sampling time interval further comprises:
receiving, by the processor circuitry, from first input circuitry, the indication of the first status event during the first sampling time interval; and
wherein receiving the indication of the second status event during the second sampling time interval prior to the randomly selected at least one transmission time further comprises;
receiving, by the processor circuitry, from second input circuitry different from the first input circuitry, the indication of the second status event during the second sampling time interval.

13. The method of claim 8
wherein the transmission time interval comprises a plurality of transmission time sub-intervals; and
wherein randomly selecting the at least one transmission time within the transmission time interval, further comprises:
randomly selecting, by the processor circuitry, a transmission time in each of the plurality of transmission time sub-intervals.

14. The method of claim 13 further comprising:
responsive to the determination that a similarity exists between the first status event and the second status event, causing, by the processor circuitry, a transmission of the first message to the network connected system controller at each of the randomly selected transmission times in each of the plurality of transmission time sub-intervals.

15. The method of claim 13 wherein causing the transmission of the second message to the network connected system controller, further comprises:
causing, by the processor circuitry, a transmission of the second message to the network connected system controller at each of the randomly selected transmission times in each of the plurality of transmission time sub-intervals.

16. A non-transitory, machine-readable, storage device that includes instructions that, when executed by processor circuitry, cause the processor circuitry to:
receive an indication of a first status event during a first sampling time interval;
generate a first message responsive to the indication of the first status event;
randomly select at least one transmission time within a transmission time interval;
receive an indication of a second status event during a second sampling time interval prior to the randomly selected at least one transmission time; and
responsive to the indication of the second status event, determine whether a similarity exists between the first status event and the second status event;

responsive to the determination that the first status event and the second status event are dissimilar, cause:
a generation of a second message based at least on the indication of the second status event and a transmission of the second message to a network connected system controller; and
an abortion of a transmission of the first message to the network connected system controller.

17. The non-transitory, machine-readable, storage device of claim 16, wherein the instructions, when executed by the processor circuitry, further cause the processor circuitry to:
cause a transmission of the first message to the network connected system controller responsive to the determination that a similarity exists between the first status event and the second status event.

18. The non-transitory, machine-readable, storage device of claim 16 wherein the instructions that cause the processor circuitry to cause the generation of the second message further cause the processor circuitry to cause:
a modification of the first message to generate the second message.

19. The non-transitory, machine-readable, storage device of claim 16:
wherein the instructions that cause the processor circuitry to receive the indication of the first status event during the first sampling time interval further cause the processor circuitry to:
receive, from first input circuitry, the indication of the first status event during the first sampling time interval; and
wherein the instructions that cause the processor circuitry to receive the indication of the second status event during the second sampling time interval prior to the randomly selected at least one transmission time further cause the processor circuitry;
receive, from the first input circuitry, the indication of the second status event during the second sampling time interval.

20. The non-transitory, machine-readable, storage device of claim 16:
wherein the instructions that cause the processor circuitry to receive the indication of of the first status event during the first sampling time interval, further cause the processor circuitry to:
receive, from first input circuitry, the indication of the first status event during the first sampling time interval; and
wherein the instructions that cause the processor circuitry to receive the indication of the second status event during the second sampling time interval prior to the randomly selected at least one transmission time, further cause the processor circuitry to;
receive, from second input circuitry different from the first input circuitry, the indication of the second status event during the second sampling time interval.

21. The non-transitory, machine-readable, storage device of claim 16:
wherein the transmission time interval comprises a plurality of transmission time sub-intervals; and
wherein the instructions that cause the processor circuitry to randomly select the at least one transmission time within the transmission time interval, further cause the processor circuitry to:
randomly select a transmission time in each of the plurality of transmission time sub-intervals.

22. The non-transitory, machine-readable, storage device of claim 21 wherein the instructions, when executed by the processor circuitry, further cause the processor circuitry to:
responsive to the determination that a similarity exists between the first status event and the second status event, cause a transmission of the first message to the network connected system controller at each of the randomly selected transmission times in each of the plurality of transmission time sub-intervals.

23. The non-transitory, machine-readable, storage device of claim 21 wherein the instructions that cause the processor circuitry to cause the transmission of the second message to the network connected system controller, further cause the processor circuitry to:
cause a transmission of the second message to the network connected system controller at each of the randomly selected transmission times in each of the plurality of transmission time sub-intervals.

* * * * *